(12) United States Patent
Goyal et al.

(10) Patent No.: US 11,281,657 B2
(45) Date of Patent: Mar. 22, 2022

(54) EVENT-DRIVEN IDENTITY GRAPH CONFLATION

(71) Applicant: Walmart Apollo, LLC, Bentonville, AR (US)

(72) Inventors: Deepak Goyal, Chandigarh (IN); Giridhar Addepalli, Bangaluru (IN); Sebastien Jean-Maurice Olivier Pehu, Novato, CA (US); Saigopal Thota, Fremont, CA (US); Mridul Jain, Cupertino, CA (US); Navinder Pal Singh Brar, Abohar (IN)

(73) Assignee: WALMART APOLLO, LLC, Bentonville, AR (US)

( * ) Notice: Subject to any disclaimer, the term of this patent is extended or adjusted under 35 U.S.C. 154(b) by 118 days.

(21) Appl. No.: 16/777,692

(22) Filed: Jan. 30, 2020

(65) Prior Publication Data
US 2021/0240693 A1    Aug. 5, 2021

(51) Int. Cl.
*G06F 16/00* (2019.01)
*G06F 16/23* (2019.01)
*G06F 16/27* (2019.01)
*G06F 16/215* (2019.01)

(52) U.S. Cl.
CPC ........ *G06F 16/2365* (2019.01); *G06F 16/215* (2019.01); *G06F 16/27* (2019.01)

(58) Field of Classification Search
None
See application file for complete search history.

(56) References Cited

U.S. PATENT DOCUMENTS

| 7,333,998 | B2* | 2/2008 | Heckerman | G06Q 30/0641 |
| 7,660,705 | B1* | 2/2010 | Meek | G06K 9/6297 703/2 |
| 7,752,179 | B1 | 7/2010 | Brown | |
| 8,972,185 | B1 | 3/2015 | Viger et al. | |
| 2013/0246480 | A1* | 9/2013 | Lemcke | G06Q 10/10 707/797 |
| 2014/0279798 | A1 | 9/2014 | Purohit et al. | |
| 2015/0032777 | A1* | 1/2015 | Dietrich | G06Q 10/067 707/798 |

(Continued)

*Primary Examiner* — Bai D Vu
(74) *Attorney, Agent, or Firm* — Bryan Cave Leighton Paisner LLP

(57) ABSTRACT

A distributed system including multiple processing nodes. The distributed system can perform certain acts. The acts can include receiving a first conflation event identifying a first node and a second node. The first node can be part of a first set. The first set can include a sole parent node stored at a first processing node of the multiple processing nodes. The second node can be part of a second set. The second set can include a sole parent node stored at a second processing node of the multiple processing nodes. The first and second sets can be disjoint sets. The first conflation event can be received at an event-driven stream application at one of the multiple processing nodes. The acts also can include conflating the first set and the second set into a conflated set. The conflated set can include the first and second nodes. The conflated set can include a sole parent node. Data for each node of the conflated set can be stored at the sole parent node of the conflated set at a processing node of the multiple processing nodes. Other embodiments are disclosed.

20 Claims, 12 Drawing Sheets

(56) References Cited

U.S. PATENT DOCUMENTS

2016/0321337 A1 11/2016 Lee et al.
2016/0335367 A1 11/2016 Wang et al.
2018/0239637 A1 8/2018 Gupta et al.

* cited by examiner

EVENT-DRIVEN IDENTITY GRAPH CONFLATION

TECHNICAL FIELD

This disclosure relates generally to performing event-driven identity graph conflation.

BACKGROUND

Identity graphs can be used to identify users, using various different pieces of information about the user. An identity graph for a user can include multiple nodes and edges. In some cases, the identity graph for a user can include disjoint sets, in which there are multiple subgraphs that are not connected to each other. These subgraphs can be spread across multiple different processing nodes.

BRIEF DESCRIPTION OF THE DRAWINGS

To facilitate further description of the embodiments, the following drawings are provided in which.

Figure 1:
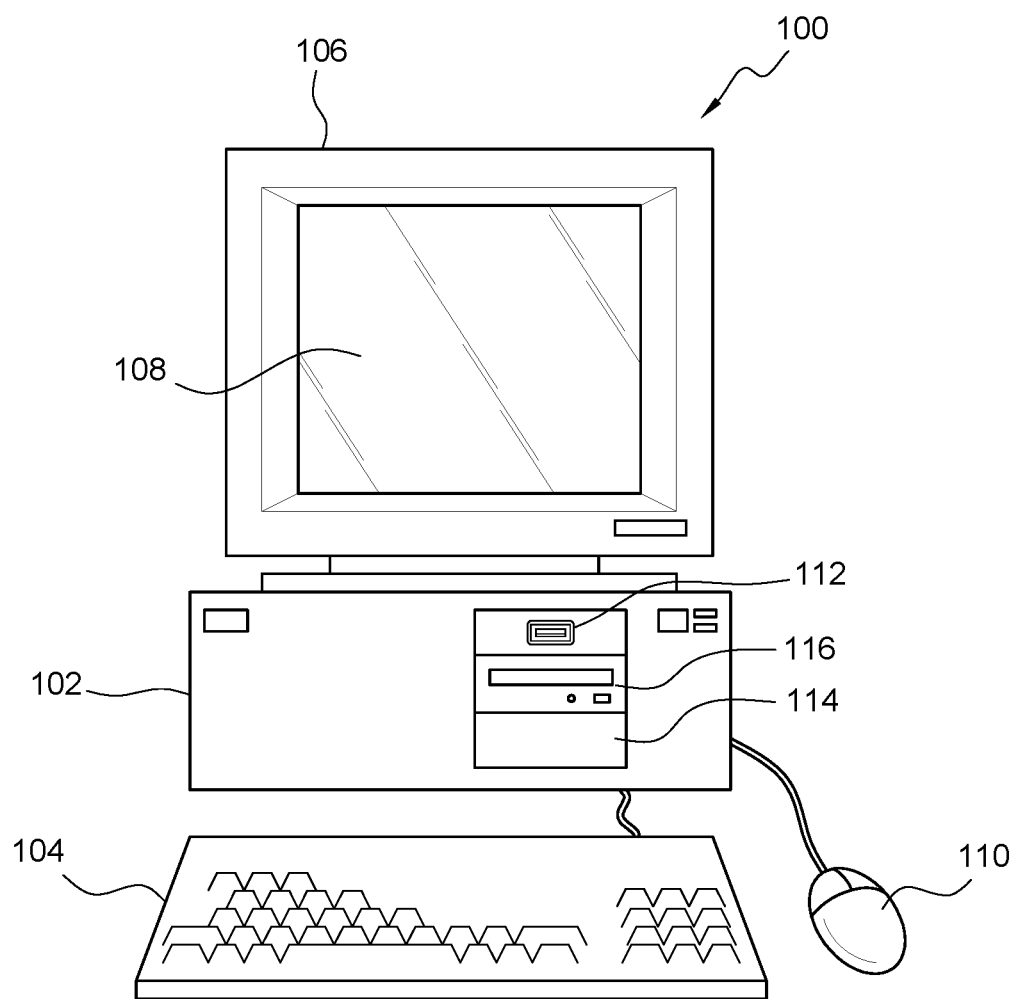
FIG. 1 illustrates a front elevational view of a computer system that is suitable for implementing an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real-time" encompasses operations that occur in "near" real-time or somewhat delayed from a triggering event. In a number of embodiments, "real-time" can mean real-time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately 0.5 second, one second, or two seconds.

DESCRIPTION OF EXAMPLES OF EMBODIMENTS

Figure 2:
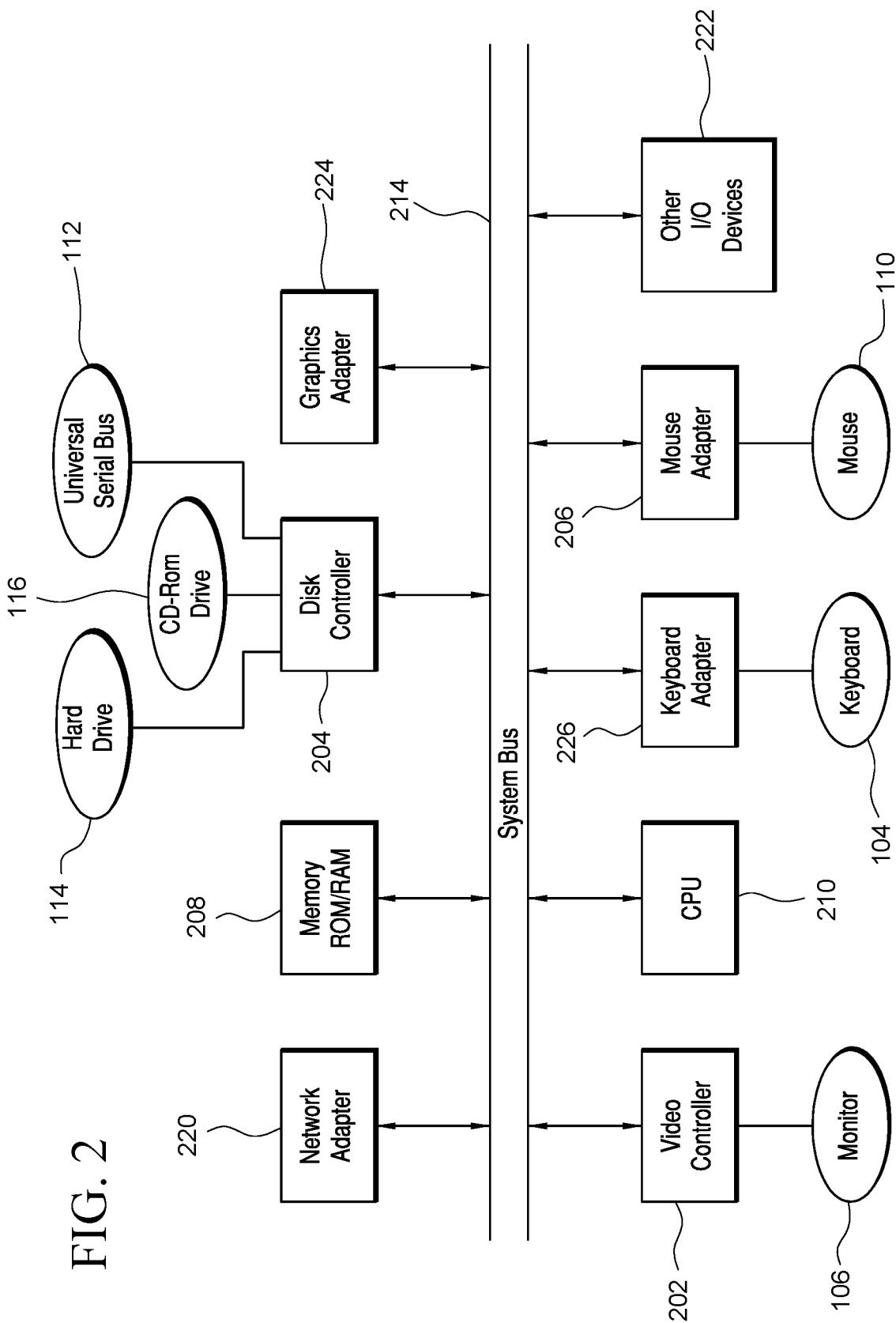
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein. As an example, a different or separate one of computer system 100 (and its internal components, or one or more elements of computer system 100) can be suitable for implementing part or all of the techniques described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to memory storage unit 208 that includes both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can include microcode such as a Basic Input-Output System (BIOS). In some examples, the one or more memory storage units of the various embodiments disclosed herein can include memory storage unit 208, a USB-equipped electronic device (e.g., an external memory storage unit (not shown) coupled to universal serial bus (USB) port 112 (FIGS. 1-2)), hard drive 114 (FIGS. 1-2), and/or CD-ROM, DVD, Blu-Ray, or other suitable media, such as media configured to be used in CD-ROM and/or DVD drive 116 (FIGS. 1-2). Non-volatile or non-transitory memory storage unit(s) refer to the portions of the memory storage units(s) that are non-volatile memory and not a transitory signal. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Exemplary operating systems can include one or more of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to a keyboard 104 (FIGS. 1-2) and a mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing a monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM and/or DVD drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 (FIG. 1) by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIGS. 1-2). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 (FIG. 1) and the circuit boards inside chassis 102 (FIG. 1) are not discussed herein.

When computer system 100 in FIG. 1 is running, program instructions stored on a USB drive in USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out all or at least part of the techniques described herein. In various embodiments, computer system 100 can be reprogrammed with one or more modules, system, applications, and/or databases, such as those described herein, to convert a general purpose computer to a special purpose computer. For purposes of illustration, programs and other executable program components are shown herein as discrete systems, although it is understood that such programs and components may reside at various times in different storage components of computing device 100, and can be executed by CPU 210. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Figure 3:
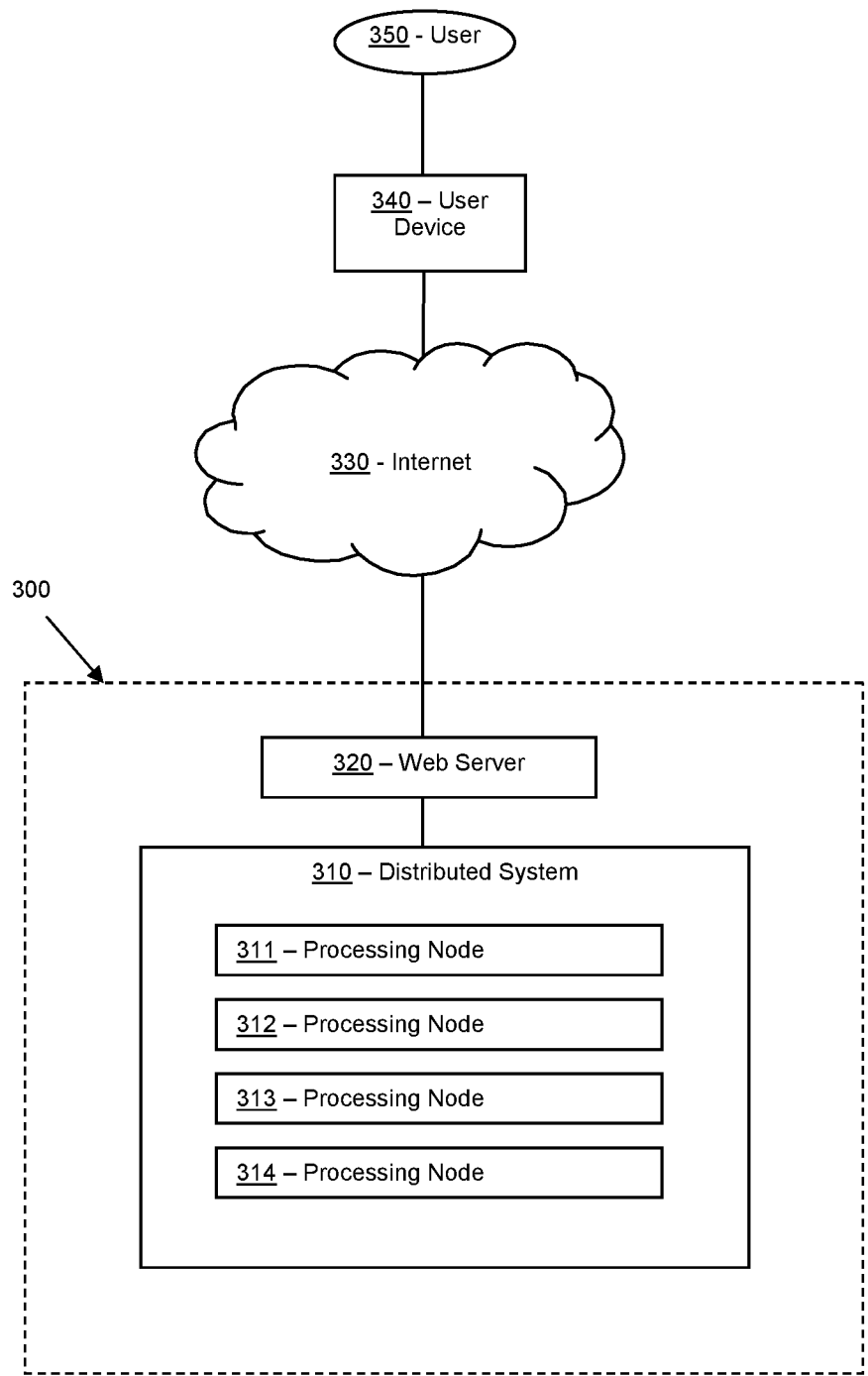
FIG. 3 illustrates a block diagram of a system that can be employed for performing event-driven identity graph conflation, according to an embodiment.

Turning ahead in the drawings, FIG. 3 illustrates a block diagram of a system 300 that can be employed for performing event-driven identity graph conflation, according to an embodiment. System 300 is merely exemplary and embodiments of the system are not limited to the embodiments presented herein. The system can be employed in many different embodiments or examples not specifically depicted or described herein. In some embodiments, certain elements, modules, or systems of system 300 can perform various procedures, processes, and/or activities. In other embodiments, the procedures, processes, and/or activities can be performed by other suitable elements, modules, or systems of system 300. In some embodiments, system 300 can include a distributed system 310 and/or web server 320.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In many embodiments, distributed system 310 can include multiple processing nodes, such as processing nodes 311-314. In many embodiments, processing nodes 311-314 and/or web server 320 can each be a computer system, such as computer system 100 (FIG. 1), as described above, and can each be a single computer, a single server, or a cluster or collection of computers or servers, or a cloud of computers or servers. In another embodiment, a single computer system can host processing nodes 311-314 and/or web server 320. Additional details regarding distributed system 310 and/or web server 320 are described herein. In some embodiments, processing nodes 311-314 each can be a virtual machine.

In some embodiments, web server 320 can be in data communication through Internet 330 with one or more user devices, such as a user device 340. User device 340 can be part of system 300 or external to system 300. In some embodiments, user device 340 can be used by users, such as a user 350. In many embodiments, web server 320 can host one or more websites and/or mobile application servers. For example, web server 320 can host a website, or provide a server that interfaces with an application (e.g., a mobile application), on user device 340, which can allow users to browse and/or search for items (e.g., products), to add items to an electronic cart, and/or to purchase items, in addition to other suitable activities.

In some embodiments, an internal network that is not open to the public can be used for communications between distributed system 310 and web server 320 within system 300, and or communications among processing nodes 311-314. Accordingly, in some embodiments, distributed system 310 (and/or the software used by such systems) can refer to a back end of system 300 operated by an operator and/or administrator of system 300, and web server 320 (and/or the software used by such systems) can refer to a front end of system 300, as is can be accessed and/or used by one or more users, such as user 350, using user device 340. In these or other embodiments, the operator and/or administrator of system 300 can manage system 300, the processor(s) of system 300, and/or the memory storage unit(s) of system 300 using the input device(s) and/or display device(s) of system 300.

In certain embodiments, the user devices (e.g., user device 340) can be desktop computers, laptop computers, a mobile device, and/or other endpoint devices used by one or more users (e.g., user 350). A mobile device can refer to a portable electronic device (e.g., an electronic device easily conveyable by hand by a person of average size) with the capability to present audio and/or visual data (e.g., text, images, videos, music, etc.). For example, a mobile device can include at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can include a volume and/or weight sufficiently small as to permit the mobile device to be easily conveyable by hand. For examples, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 15.6 Newtons, 17.8 Newtons, 22.3 Newtons, 31.2 Newtons, and/or 44.5 Newtons.

Exemplary mobile devices can include (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile device can include an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Android™ operating system developed by the Open Handset Alliance, or (iv) the Windows Mobile™ operating system by Microsoft Corp. of Redmond, Wash., United States of America.

In many embodiments, distributed system 310 and/or web server 320 can each include one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to distributed system 310 and/or web server 320 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processor(s) and/or the memory storage unit(s). In some embodiments, the KVM switch also can be part of distributed system 310 and/or web server 320. In a similar manner, the processors and/or the non-transitory computer-readable media can be local and/or remote to each other.

Meanwhile, in many embodiments, distributed system 310 and/or web server 320 also can be configured to communicate with one or more databases (not shown). The one or more databases can include a product database that contains information about products, items, or SKUs (stock keeping units), among other information, as described below in further detail. The one or more databases can be stored on one or more memory storage units (e.g., non-transitory computer readable media), which can be similar or identical to the one or more memory storage units (e.g., non-transitory computer readable media) described above with respect to computer system 100 (FIG. 1). Also, in some embodiments, for any particular database of the one or more databases, that particular database can be stored on a single memory storage unit or the contents of that particular database can be spread across multiple ones of the memory storage units storing the one or more databases, depending on the size of the particular database and/or the storage capacity of the memory storage units.

The one or more databases can each include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, distributed system 310, web server 320, and/or the one or more databases can be implemented using any suitable manner of wired and/or wireless communication. Accordingly, system 300 can include any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

In many embodiments, distributed system 310 can perform event-driven identity graph conflation. In many embodiments, information can be stored and related to each other using a graph. For example, user data can be collected, which can include data that is obtained from various channels including internal sources and external sources for a user (e.g., 350), such as a customer. As a result, a retailer may be able to more effectively track user activity, such as in-store purchases, online purchases, user advertisement activities, or any other suitable customer related activities to a user.

In many embodiments, the graph can be based on linkage data identifying a plurality of linkages, where each linkage identifies a link between a plurality of nodes. Each node can represent, for example, different user data. In some examples, the linking data can be based on transaction data, such as instore or online transaction data. For example, each node can represent an identifying feature of a user or transaction. For example, a node may identify an online identification (ID) such as a cookie, a user account identifier (e.g., when a user logged in) a credit card number, a purchase timestamp, a user name, a purchase timestamp, or a network address, for example. In some examples, a node can be known as a "traceable entity identifier," or simply "trentyid" or "tid." For example, credit cards, login account identifiers, cookies, and other suitable types of information obtained in transactions are traceable to identify a user. Other forms of information obtained in a transaction, such as cash payment, are not traceable, but the identity of the user can be obtained in some cases based on other information that is traceable. Linkage data may "link" two or more nodes together, indicating that the two are associated. For example, linkage data may link a credit card number and an online identifier together, based on a transaction in which credit card number and the online identifier were used together. In a number of embodiments, a graph of nodes and edges can be used to represent the linkages of the nodes. The graph can be referred to as a customer identity graph, as it can include information that identifies the customers (e.g., users).

In many embodiments, the graph can be designed so that each user is represented by a separate subgraph. However, in some cases, nodes that represent a single user can be located in different subgraphs, in which these different subgraphs are disjoint sets. For example, a node in a subgraph for a particular user can be removed, which in some cases can create two separate subgraphs for the user. As another example, a user can use multiple different devices (e.g., user computer 340) to perform transactions, which can create multiple different subgraphs for the user. Once the user logs in at one of the user devices, for example, it can be determined that the user is the same user for both subgraphs. As yet another example, a user can have different logins for different subsidiaries of an entity that operates system 300 (FIG. 3). When it is determined that there are multiple subgraphs in disjoint sets that represent the same user, a conflation request can be used to conflate the multiple subgraphs.

Figure 4:
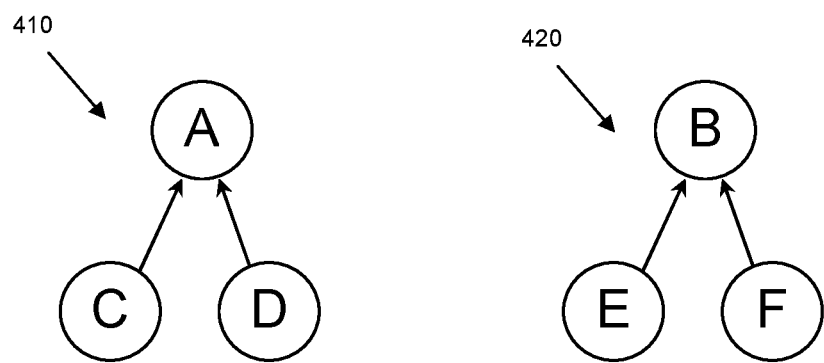
FIG. 4 illustrates exemplary subgraphs.

Turning ahead in the drawings, FIG. 4 illustrates exemplary subgraphs 410 and 420. Subgraphs 410 and 420 can be multiple graphs subgraphs that include nodes that represent an identity of a user. Subgraphs 410 and 420 can include three nodes, namely nodes A, C, and D. A can be a parent node, and nodes C and D can be child nodes that are mapped to node A. Similarly, subgraph 420 can include three nodes, namely nodes B, E, and F. B can be a parent node, and nodes E and F can be child nodes that are mapped to node B. Each of the nodes can represent a different tid for a user (e.g., user 350 (FIG. 3)). In a number of embodiments, the nodes can be distributed across multiple processing nodes of a distributed system. The processing nodes can be different partitions and/or different machines of the distributed system. For example, node A can be on a first processing node, node B can be on a second processing node, node C can be on a third processing, node D can be on a fourth processing node, node E can be on the first processing node, and node F can be on the fourth processing node. In a number of embodiments, each of the subgraphs can have a height limit of 2, meaning that, if there are any child nodes, each of the child nodes points directly to the parent node. In other words, each of the subgraphs can be a star graph.

In many embodiments, in order to efficiently process the data in the graph, the representation of the node on the different processing nodes can be pointer to the primary node, which can be referred to as the trenty graph identifier, or simply tgid. The tgid can include the data for each of the nodes in the subgraph. For example, node A can point to the tgid for node A stored at the first processing node, which can include the data for node A, the data for node C, and the data for node D, all stored at the first processing node. Node C can point to node A, and node D can point to node A, such that the data for nodes C and D can be accessed using the pointer to obtain the data in the tgid for node A. Similarly, node B can point to a tgid for node B stored at the second processing node, which can include the data for nodes B, E, and F, all stored at the second processing node. In many embodiments, the parent node can be the smallest lexicographically of the nodes in the subgraph.

Figure 5:
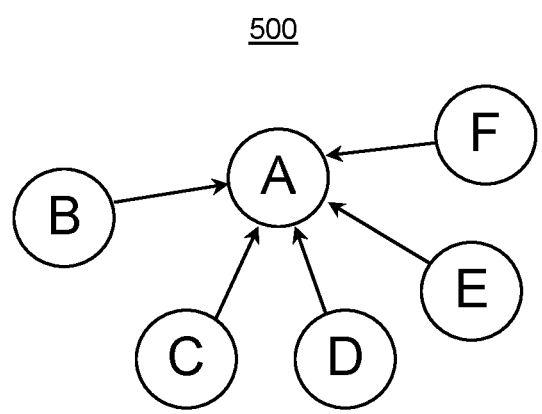
FIG. 5 illustrates an exemplary subgraph formed by conflating the subgraphs of FIG. 4.

In a number of embodiments, multiple subgraphs for a user, such as subgraphs 410 and 420, can be conflated to generate a combined subgraph for the user. Proceeding to the next drawing, FIG. 5 illustrates an exemplary subgraph 500 formed by conflating subgraphs 410 and 420 (FIG. 4). Subgraph 500 can include the nodes of subgraphs 410 and 420 (FIG. 4). Specifically, subgraph 500 includes nodes A-F. In subgraph 500, node A can be the parent node, and each of nodes B-F, can be child nodes mapped to node A. Nodes A-F can continue to be distributed across multiple processing nodes of the distributed system. For example, node A can continue to be on the first processing node, node B can continue to be on the second processing node, node C can continue to be on the third processing, node D can continue to be on the fourth processing node, node E can continue to be on the first processing node, and node F can continue to be on the fourth processing node. Subgraph 500 can conform to the height limit of 2, such that subgraph 500 is a star graph, which advantageously can decrease latencies when performing processing using subgraph 500. Node A can point to the tgid for node A, which can include the data for all of nodes A-F, all stored at the first processing node.

Mathematically, a conflation operator × can operate on a set U of graphs g, such that $\forall g \in U$, g.root<g.root.children, and height(g)<=2. The conflation operation a×b, where × is the conflation operator, is defined as an operation on a,b∈U, where a<b, then a becomes the new root containing b and b's children as its children, such that a×b∈U In many embodiments, the conflation operation can be commutative, such that a×b=b×a for all a,b∈U.

In a number of embodiments, each of the processing nodes can run a separate queue-task-state (QTS) cluster for event-driven processing. For example, the QTS cluster for a processing node can be a combination of a Kafka cluster and a Kafka Streams application. Kafka Streams and Kafka cluster are part of Apache Kafka, which is a conventional distributed streaming platform. Kafka Streams can be used to build applications and microservices, in which the input and the output are stored in the Kafka clusters. The Kafka cluster can handle the queue portion of the QTS cluster, and the Kafka Streams application can handle the task and the state portion of the QTS cluster. The Kafka Streams application can maintain a data store for storing a state, and can have a processing framework to process events consumed from a Kafka cluster in a fault-tolerant manner. An n-partitioned QTS cluster can have a Kafka cluster whose topics have n partitions, and can have a Kafka Streams application having n tasks and n state stores with a one-to-one mapping among the queue, the task, and the state. For example, at a first partition, events consumed from the first queue are processed by the first task using the first state. Event processing can be performed using the state associated with the task and queue associated with that particular partition.

In conventional graph conflation approaches, a request can be made to conflate multiple graphs, which often can involve performing a Union-Find algorithm with Path Compression. Such processing can be involve a request-response format that blocks ongoing processing until the request is completed. In event-driven processing, such as using Kafka clusters and Kafka Streams applications, events can be handled asynchronously, such that processing an event does not block on-going event processing. In many embodiments, events can be serializable, such that the processing between two nodes involves a single linkage between those nodes. A single connection among three nodes can be broken into smaller linkages of two nodes. In a number of embodiments, the event-driven processing can be eventually consistent. In many embodiments, the even-driven processing can be commutative, as described above. In several embodiments, the event-driven processing can be performed in real-time for each event. In a number of embodiments, the event-driven processing approach, such as QTS, can provide at least-once event delivery semantics, and/or in-order event delivery semantics. Kafka clusters and Kafka Streams applications can satisfy these conditions.

Figure 6:
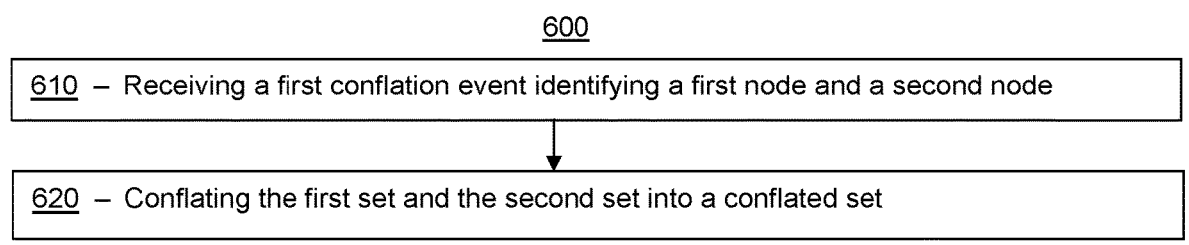
FIG. 6 illustrates a flow chart for a method, according to an embodiment.

Turning ahead in the drawings, FIG. 6 illustrates a flow chart for a method 600, according to an embodiment. In some embodiments, method 600 can be a method of performing event-driven identity graph conflation. Method 600 is merely exemplary and is not limited to the embodiments presented herein. Method 600 can be employed in many different embodiments or examples not specifically depicted or described herein. In some embodiments, the procedures, the processes, and/or the activities of method 600 can be performed in the order presented. In other embodiments, the procedures, the processes, and/or the activities of method 600 can be performed in any suitable order. In still other embodiments, one or more of the procedures, the processes, and/or the activities of method 600 can be combined or skipped.

In many embodiments, system 300 (FIG. 3), distributed system 310 (FIG. 3), and/or web server 320 (FIG. 3) can be suitable to perform method 600 and/or one or more of the activities of method 600. In these or other embodiments, one or more of the activities of method 600 can be implemented as one or more computing instructions configured to run at one or more processors and configured to be stored at one or more non-transitory computer readable media. Such non-transitory computer readable media can be part of system 300. The processor(s) can be similar or identical to the processor(s) described above with respect to computer system 100 (FIG. 1).

In some embodiments, method 600 and other blocks in method 600 can include using a distributed network including distributed memory architecture to perform the associated activity. This distributed architecture can reduce the impact on the network and system resources to reduce congestion in bottlenecks while still allowing data to be accessible from a central location.

Referring to FIG. 6, method 600 can include a block 610 of receiving a first conflation event identifying a first node and a second node. In many embodiments, the first node can be part of a first set. The first set can be similar to subgraph 410 (FIG. 4). In several embodiments, the first set can include a sole parent node stored at a first processing node of multiple processing nodes of a distributed system. The sole parent node of the first set can be similar to node A of subgraph 410 (FIG. 4). The distributed system can be similar or identical to distributed system 310 (FIG. 3). The multiple processing nodes can be similar of identical to processing nodes 311-314 (FIG. 3). In a number of embodiments, the second node can be part of a second set. The second set can be similar to subgraph 420 (FIG. 4). In many embodiments, the second set can include a sole parent node stored at a second processing node of the multiple processing nodes. The sole parent node of the second set can be similar to node B of subgraph 420 (FIG. 4). In several embodiments, the first and second sets can be disjoint sets. In many embodiments, first conflation event can be received at an event-driven stream application at one of the multiple processing nodes. In some embodiments, the event-driven stream application can be part of a QTS cluster, such as a Kafka Stream application.

In a number of embodiments, method 600 also can include a block 620 of conflating the first set and the second set into a conflated set. The conflated set can be similar to subgraph 500 (FIG. 5). In many embodiments, the conflated set can include the first and second nodes. In some embodiments, the conflated set can include a sole parent node. The sole parent node of the conflated set can be similar to node A of subgraph 500 (FIG. 5). In a number of embodiments, data for each node of the conflated set can be stored at the sole parent node of the conflated set at a processing node of the multiple processing nodes. For example, as described above, data for nodes A-F of subgraph 500 (FIG. 5) can be stored at the first processing node in a tgid associated with node A. In many embodiments, the conflation can include the activities shown in FIGS. 7-12, and described below.

Figure 7:
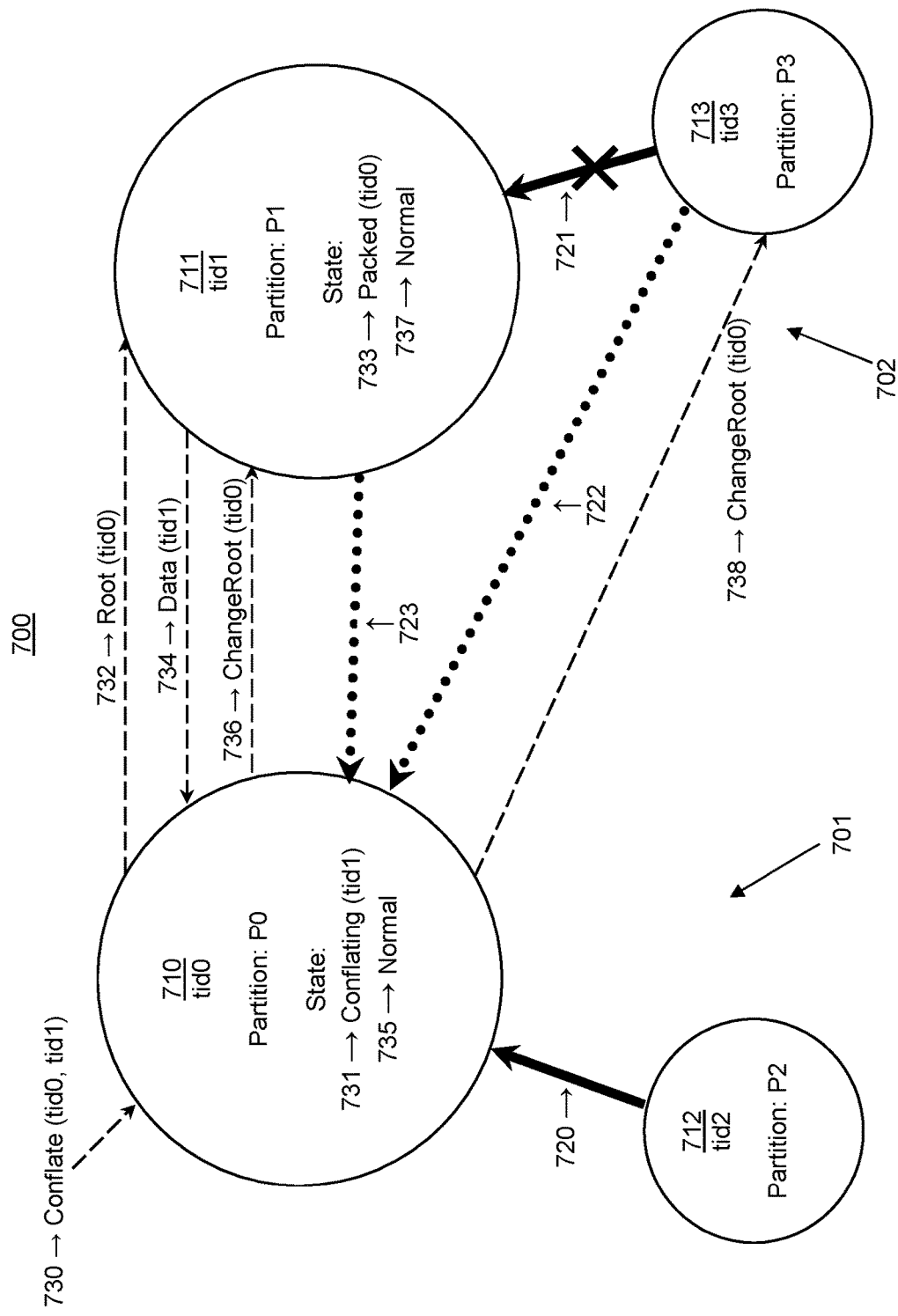
FIG. 7 illustrates a block diagram of an exemplary subgraph having nodes distributed across partitions of a distributed system, and showing a sequence of messages and state changes that cause a conflation of two subgraphs into a single subgraph.

Turning ahead in the drawings, FIG. 7 illustrates a block diagram of an exemplary subgraph 700 having nodes 710-713 distributed across partitions of a distributed system, and showing a sequence of messages and state changes that cause a conflation of two subgraphs into a single subgraph. Subgraph 700 is merely exemplary, and examples of subgraphs are not limited to those examples shown herein. The subgraphs can involve other configurations than those specifically depicted or described herein. In some embodiments, the procedures, the processes, and/or the activities of shown in FIG. 7 can be performed in the order presented. In other embodiments, the procedures, the processes, and/or the activities shown in FIG. 7 can be performed in another suitable order. In still other embodiments, one or more of the procedures, the processes, and/or the activities shown in FIG. 7 can be combined or skipped. In many embodiments, the procedures, processes, and/or the activities shown in FIG. 7 can be implemented on distributed system 310 (FIG. 3).

In a number of embodiments, node 710 can be a parent node of a first subgraph 701 of subgraph 700. In several embodiments, node 710 can represent a tid labeled tid0, and can be stored on a partition P0, which can be one of the multiple processing nodes (e.g., 311-314 (FIG. 3)). Node 711 can be a parent node of a second subgraph 702 of subgraph 700. In several embodiments, node 711 can represent a tid labeled tid1, and can be stored on a partition P1, which can be another of the multiple processing nodes (e.g., 311-314 (FIG. 3)). Node 712 can be a child node of first subgraph 701 of subgraph 700 that is mapped to node 710, as represented by a mapping 720. In several embodiments, node 712 can represent a tid labeled tid2, and can be stored on a partition P2, which can be another of the multiple processing nodes (e.g., 311-314 (FIG. 3)). Node 713 can be a child node of second subgraph 702 of subgraph 700 that is mapped to node 711, as represented by a mapping 721. In several embodiments, node 713 can represent a tid labeled tid3, and can be stored on a partition P3, which can be another of the multiple processing nodes (e.g., 311-314 (FIG. 3)). In many embodiments, node 710 can include a tgid that stores the data for nodes 710 and 712 on partition P0, and/or node 711 can include a tgid that stores the data for nodes 711 and 713 on partition P1. Subgraphs 701 and 702 can be disjoint sets. Nodes 710-713 can be nodes that represent a single user (e.g., 350 (FIG. 3)), such that it can be advantageous to conflate subgraphs 701 and 702 into a single, unified subgraph.

In a number of embodiments, a conflation event 730 can be received at partition P0. Conflation event 730 can specify tid0 and tid1, which can be a request to combine nodes 710 and 711 into a single, unified subgraph. In many embodiments, when conflation event 730 is received at partition P0, conflation event 730 can be stored in a queue in a Kafka cluster at partition P0, and then can be processed by a Kafka Streams application at partition P0. Conflation event 730 can be processed at partition P0 by performing a state change 731 of a state of node 710 (tid0) from a normal state to a conflating state, and can store that the conflating is being performed with tid1, which collectively can indicate that tid0 is in an on-going conflation with tid1. In a number of embodiments, node 710 (tid0) can send to node 711 (tid1) a root event 732 that specifies tid0, which can indicate that tid0 wants to conflate with tid1.

In several embodiments, root event 732 can be received at partition P1. In many embodiments, when root event 732 is received at partition P1, root event 732 can be stored in a queue in a Kafka cluster at partition P1, and then can be processed by a Kafka Streams application at partition P1. Root event 732 can be processed at partition P1 by comparing parent nodes (root nodes) tid0 and tid1, to determine which node is lexicographically smaller, which in this case can be tid0, such that tid0 should be the new parent node (root). In many embodiments, node 711 (tid1) can perform a state change 733 by changing its state from a normal state to a packed state, and can store that the packing is being performed with tid0, which can indicate that tid1 is packing and sending the data in its associated tgid to another root node, namely tid0. In a number of embodiments, node 711 (tid1) can send to node 710 (tid0) a data event 734 that includes the data in the tgid for node 711 (tid1), such as the data for node 711 (tid1) and node 713 (tid3).

In several embodiments, data event 734 can be received at partition P0. In many embodiments, when data event 734 is received at partition P0, data event 734 can be stored in the queue in the Kafka cluster at partition P0, and then can be processed by the Kafka Streams application at partition P0. Data event 734 can be processed at partition P0 by unpacking the data in data event 734 to obtain the data for node 711 (tid1) and node 713 (tid3), and this data can be stored locally in partition P0 in the tgid associated with tid0. In a number of embodiments, node 710 (tid0) can perform a state change 735 by changing its state from the conflating state to the normal state, which can indicate that tid0 now has the data for tid1 and tid3. In a number of embodiments, node 710 (tid0) can send to node 711 (tid1) a change root event 736 specifying tid0, which can indicate that tid0 is now the parent node for node 711 (tid1), and/or can send to node 713 (tid3) a change root event 738 specifying tid0, which can indicate that tid0 is now the parent node for node 713 (tid3).

In several embodiments, change root event 736 can be received at partition P1. In many embodiments, when change root event 736 is received at partition P1, change root event 736 can be stored in the queue in the Kafka cluster at partition P1, and then can be processed by the Kafka Streams application at partition P1. Change root event 736 can be processed at partition P1 by node 711 (tid1) deleting its stored data for node 711 (tid1) and deleting its stored data for node 713 (tid3). Node 711 (tid1) also can change its parent to node 710 (tid0), by creating a mapping 723 from node 711 (tid1) to node 710 (tid0). Node 711 additionally can perform a state change 737 by changing its state from the packed state to the normal state, which can indicate that tid1 has finished conflating with tid0.

In a number of embodiments, change root event 738 can be received at partition P3. In many embodiments, when change root event 738 is received at partition P3, change root event 738 can be stored in a queue in a Kafka cluster at partition P3, and then can be processed by a Kafka Streams application at partition P3. Change root event 738 can be processed at partition P3 by node 713 (tid3) changing its parent to node 710 (tid0), which can be performed by creating a mapping 722 from node 713 (tid3) to node 710 (tid0), and deleting mapping 721 from node 713 (tid3) to node 711 (tid1).

In many embodiments, block 620 (FIG. 6) of conflating the first set and the second set into a conflated set can be implemented as shown in FIG. 7. In a number of embodiments, the first node can be the sole parent node of the first set. For example, the first node can be similar or identical to node 710 (tid0), and/or the first set can be similar or identical to subgraph 701. The first processing node can be similar or identical to partition P0. In many embodiments, the second node can be the sole parent node of the second set. For example, the second node can be similar or identical to node 711 (tid1), and/or the second set can be similar or identical to subgraph 702. The second processing node can be similar or identical to partition P1. In a number of embodiments, the first node can be lexicographically smaller than the second node. In some embodiments, data for the first node can be stored at the first node. For example, the data for tid0 can be stored in a tgid associated with tid0 in partition P0. In various embodiments, the second set further can include a third node that is a child node mapped to the second node. The third node can be similar or identical to node 713 (tid3). The third node can be stored at a third processing node of the multiple processing nodes. The third processing node can be similar or identical to partition P3. In many embodiments, data for the second node and data for the third node can be stored at the second node. For example, the data for tid1 and tid3 can be stored in a tgid associated with tid1 in partition P1.

In a number of embodiments, the first set further can include a fourth node that is a child node mapped to the first node. The fourth node can be similar or identical to node 712 (tid2). In several embodiments, the fourth node can be stored at a fourth processing node of the multiple processing nodes. The fourth processing node can be similar or identical to partition P2. In various embodiments, data for the fourth node can be stored at the first node. For example, the data for tid2 can be stored in the tgid associated with tid0 in partition P0.

In several embodiments, the first conflation event can be received at the first processing node. For example, the first conflation event can be similar or identical to conflation event 730. In a number of embodiments, block 620 (FIG. 6) of conflating the first set and the second set into the conflated set further can include various activities. The activities can include changing a state of the first node to a conflating state, which can be similar or identical to state change 731. The activities also can include sending, from the first node to the second node, a root event identifying the first node, which can be similar or identical to root event 732. The activities additionally can include determining, at the second node, that the first node is lexicographically smaller than the second node. The activities further can include changing a state of the second node to a packed state, which can be similar or identical to state change 733. The activities also can include sending, from the second node to the first node, a data event comprising the data for the second node and the data for the third node. The data event can be similar or identical to data event 734. The activities additionally can include storing the data for the second node and the data for the third node at the first node. The activities further can include changing the state of the first node to a normal state, which can be similar or identical to state change 735. The activities additionally can include sending, from the first node to each of the second node and the third node, a change-root event identifying the first node, which can be similar or identical to change root event 736 and/or change root event 738. The activities further can include deleting the data for the second node and the data for the third node from the second node. The activities additionally can include setting the second node to be a child node mapped to the first node, which can be similar or identical to creating mapping 723. The activities further can include changing the state of the second node to a normal state, which can be similar or identical to state change 737. The activities additionally can include setting the third node to be a child node mapped to the first node, which can be similar or identical to creating mapping 722 and/or deleting mapping 721. The conflated set can be similar or identical to subgraph 700, once the processing described above has completed. The sole parent node of the conflated set can be node 710 (tid0).

Figure 8:
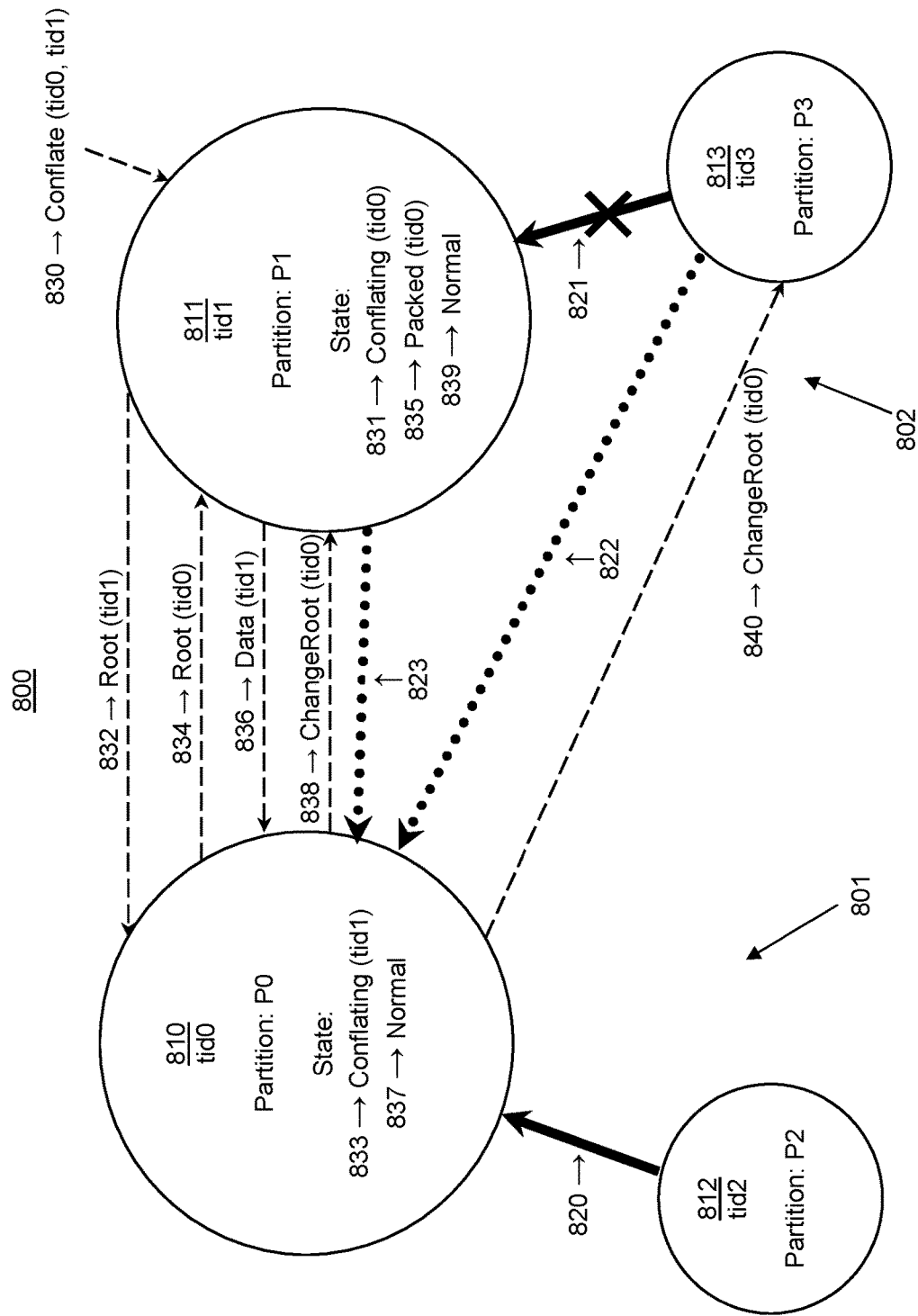
FIG. 8 illustrates a block diagram of an exemplary subgraph having nodes distributed across partitions of a distributed system, and showing a sequence of messages and state changes that cause a conflation of two subgraphs into a single subgraph, when a conflation event is received at a different parent node than in FIG. 7.

Turning ahead in the drawings, FIG. 8 illustrates a block diagram of an exemplary subgraph 800 having nodes 810-813 distributed across partitions of a distributed system, and showing a sequence of messages and state changes that cause a conflation of two subgraphs into a single subgraph. Subgraph 800 is merely exemplary, and examples of subgraphs are not limited to those examples shown herein. The subgraphs can involve other configurations than those specifically depicted or described herein. In some embodiments, the procedures, the processes, and/or the activities of shown in FIG. 8 can be performed in the order presented. In other embodiments, the procedures, the processes, and/or the activities shown in FIG. 8 can be performed in another suitable order. In still other embodiments, one or more of the procedures, the processes, and/or the activities shown in FIG. 8 can be combined or skipped. In many embodiments, the procedures, processes, and/or the activities shown in FIG. 8 can be implemented on distributed system 310 (FIG. 3).

Subgraph 800 can be similar or identical to subgraph 700 (FIG. 7) at the beginning before a conflation event is received. In a number of embodiments, node 810 can be a parent node of a first subgraph 801 of subgraph 800. In several embodiments, node 810 can represent a tid labeled tid0, and can be stored on a partition P0, which can be one of the multiple processing nodes (e.g., 311-314 (FIG. 3)). Node 811 can be a parent node of a second subgraph 802 of subgraph 800. In several embodiments, node 811 can represent a tid labeled tid1, and can be stored on a partition P1, which can be another of the multiple processing nodes (e.g., 311-314 (FIG. 3)). Node 812 can be a child node of first subgraph 801 of subgraph 800 that is mapped to node 810, as represented by a mapping 820. In several embodiments, node 812 can represent a tid labeled tid2, and can be stored on a partition P2, which can be another of the multiple processing nodes (e.g., 311-314 (FIG. 3)). Node 813 can be a child node of second subgraph 802 of subgraph 800 that is mapped to node 811, as represented by a mapping 821. In several embodiments, node 813 can represent a tid labeled tid3, and can be stored on a partition P3, which can be another of the multiple processing nodes (e.g., 311-314 (FIG. 3)). In many embodiments, node 810 can include a tgid that stores the data for nodes 810 and 812 on partition P0, and/or node 811 can include a tgid that stores the data for nodes 811 and 813 on partition P1. Subgraphs 801 and 802 can be disjoint sets. Nodes 810-813 can be nodes that represent a single user (e.g., 350 (FIG. 3)), such that it can be advantageous to conflate subgraphs 801 and 802 into a single, unified subgraph. Nodes 810-813 can be similar or identical to nodes 710-713 (FIG. 7), respectively, subgraphs 801-802 can be similar or identical to subgraphs 701-702 (FIG. 7), respectively, and/or mappings 820-821 can be similar or identical to mappings 720-721 (FIG. 7), respectively.

In a number of embodiments, a conflation event 830 can be received at partition P1. Conflation event 830 can specify tid0 and tid1, which can be a request to combine nodes 810 and 811 into a single, unified subgraph. In many embodiments, when conflation event 830 is received at partition P1, conflation event 830 can be stored in a queue in a Kafka cluster at partition P1, and then can be processed by a Kafka Streams application at partition P1. Conflation event 830 can be processed at partition P1 by performing a state change 831 of a state of node 811 (tid1) from a normal state to a conflating state, and can store that the conflating is being performed with tid0, which collectively can indicate that tid1 is in an on-going conflation with tid0. In a number of embodiments, node 811 (tid1) can send to node 810 (tid0) a root event 832 that specifies tid1, which can indicate that tid1 wants to conflate with tid0.

In several embodiments, root event 832 can be received at partition P0. In many embodiments, when root event 832 is received at partition P0, root event 832 can be stored in a queue in a Kafka cluster at partition P0, and then can be processed by a Kafka Streams application at partition P0. Root event 832 can be processed at partition P0 by comparing parent nodes (root nodes) tid0 and tid1, to determine which node is lexicographically smaller, which in this case can be tid0, such that tid0 should be the new parent node (root). In many embodiments, node 810 (tid0) can perform a state change 833 by changing its state from a normal state to a conflating state and can store that the conflating is being performed with tid1, which collectively can indicate that tid0 is in an on-going conflation with tid1. In a number of embodiments, node 810 (tid0) can send to node 811 (tid1) a root event 834 that specifies tid0, which can indicate that tid0 wants to conflate with tid1. This additional root event can be sent because tid0 determined that it was lexicographically smaller than tid1.

In several embodiments, root event 834 can be received at partition P1. In many embodiments, when root event 834 is received at partition P1, root event 834 can be stored in the queue in the Kafka cluster at partition P1, and then can be processed by the Kafka Streams application at partition P1. Root event 834 can be processed at partition P1 by determining that root event 834 is for tid0, which and that the state of tid1 is conflation with tid0 and/or by determining that comparing parent nodes (root nodes) tid0 and tid1, to determine which node is lexicographically smaller, which in this case can be tid0, such that tid0 should be the new parent node (root). In many embodiments, node 811 (tid1) can perform a state change 835 by changing its state from the conflating state to a packed state and can store that the packing is being performed with tid0, which can indicate that tid1 is packing and sending the data in its associated tgid to another root node, namely tid0. In a number of embodiments, node 811 (tid1) can send to node 810 (tid0) a data event 836 that includes the data in the tgid for node 811 (tid1), such as the data for node 811 (tid1) and node 813 (tid3).

In several embodiments, data event 836 can be received at partition P0. In many embodiments, when data event 836 is received at partition P0, data event 836 can be stored in the queue in the Kafka cluster at partition P0, and then can be processed by the Kafka Streams application at partition P0. Data event 836 can be processed at partition P0 by unpacking the data in data event 836 to obtain the data for node 811 (tid1) and node 813 (tid3), and this data can be stored locally in partition P0 in the tgid associated with tid0. In a number of embodiments, node 810 (tid0) can perform a state change 837 by changing its state from the conflating state to the normal state, which can indicate that tid0 now has the data for tid1 and tid3. In a number of embodiments, node 810 (tid0) can send to node 811 (tid1) a change root event 838 specifying tid0, which can indicate that tid0 is now the parent node for node 811 (tid1), and/or can send to node 813 (tid3) a change root event 840 specifying tid0, which can indicate that tid0 is now the parent node for node 813 (tid3).

In several embodiments, change root event 838 can be received at partition P1. In many embodiments, when change root event 838 is received at partition P1, change root event 838 can be stored in the queue in the Kafka cluster at partition P1, and then can be processed by the Kafka Streams application at partition P1. Change root event 838 can be processed at partition P1 by node 811 (tid1) deleting its stored data for node 811 (tid1) and deleting its stored data for node 813 (tid3). Node 811 (tid1) also can change its parent to node 810 (tid0), by creating a mapping 823 from node 811 (tid1) to node 810 (tid0). Node 811 additionally can perform a state change 839 by changing its state from the packed state to the normal state, which can indicate that tid1 has finished conflating with tid0.

In a number of embodiments, change root event 840 can be received at partition P3. In many embodiments, when change root event 840 is received at partition P3, change root event 840 can be stored in a queue in a Kafka cluster at partition P3, and then can be processed by a Kafka Streams application at partition P3. Change root event 840 can be processed at partition P3 by node 813 (tid3) changing its parent to node 810 (tid0), which can be performed by creating a mapping 822 from node 813 (tid3) to node 810 (tid0), and deleting mapping 821 from node 813 (tid3) to node 811 (tid1).

Although the events processed to handle conflation event 730 in FIG. 7 are somewhat different from the events processed to handle conflation event 830 in FIG. 8, the final output is the same, which indicates that the conflation operation is commutative, and not dependent on the partition at which the conflation event is received.

In many embodiments, block 620 (FIG. 6) of conflating the first set and the second set into a conflated set can be implemented as shown in FIG. 8. In a number of embodiments, the first node can be the sole parent node of the first set. For example, the first node can be similar or identical to node 810 (tid0), and/or the first set can be similar or identical to subgraph 801. The first processing node can be similar or identical to partition P0. In many embodiments, the second node can be the sole parent node of the second set. For example, the second node can be similar or identical to node 811 (tid1), and/or the second set can be similar or identical to subgraph 802. The second processing node can be similar or identical to partition P1. In a number of embodiments, the first node can be lexicographically smaller than the second node. In some embodiments, data for the first node can be stored at the first node. For example, the data for tid0 can be stored in a tgid associated with tid0 in partition P0. In various embodiments, the second set further can include a third node that is a child node mapped to the second node. The third node can be similar or identical to node 813 (tid3). The third node can be stored at a third processing node of the multiple processing nodes. The third processing node can be similar or identical to partition P3. In many embodiments, data for the second node and data for the third node can be stored at the second node. For example, the data for tid1 and tid3 can be stored in a tgid associated with tid1 in partition P1.

In a number of embodiments, the first set further can include a fourth node that is a child node mapped to the first node. The fourth node can be similar or identical to node 712 (tid2). In several embodiments, the fourth node can be stored at a fourth processing node of the multiple processing nodes. The fourth processing node can be similar or identical to partition P2. In various embodiments, data for the fourth node can be stored at the first node. For example, the data for tid2 can be stored in the tgid associated with tid0 in partition P0.

In several embodiments, the first conflation event can be received at the second processing node. For example, the first conflation event can be similar or identical to conflation event 830. In a number of embodiments, block 620 (FIG. 6) of conflating the first set and the second set into the conflated set further can include various activities. The activities can include changing a state of the second node to a conflating state, which can be similar or identical to state change 831. The activities additionally can include sending, from the second node to the first node, a first root event identifying the second node, which can be similar or identical to root event 832. The activities further can include determining, at the first node, that the first node is lexicographically smaller than the second node. The activities additionally can include changing a state of the first node to the conflating state, which can be similar or identical to state change 833. The activities further can include sending, from the first node to the second node, a second root event identifying the first node, which can be similar or identical to root event 834. The activities additionally can include changing the state of the second node to a packed state, which can be similar or identical to state change 835. The activities further can include sending, from the second node to the first node, a data event comprising the data for the second node and the data for the third node, which can be similar or identical to data event 836. The activities additionally can include storing the data for the second node and the data for the third node at the first node. The activities further can include changing the state of the first node to a normal state, which can be similar or identical to state change 837. The activities additionally can include sending, from the first node to each of the second node and the third node, a change-root event identifying the first node, which can be similar or identical to change root event 838 and/or change root event 840. The activities further can include deleting the data for the second node and the data for the third node from the second node. The activities additionally can include setting the second node to be a child node mapped to the first node, which can be similar or identical to creating mapping 823. The activities further can include changing the state of the second node to a normal state, which can be similar or identical to state change 839. The activities additionally can include setting the third node to be a child node mapped to the first node, which can be similar or identical to creating mapping 822 and/or deleting mapping 821. The conflated set can be similar or identical to subgraph 800, once the processing described above has completed. The sole parent node of the conflated set can be node 810 (tid0).

Figure 9:
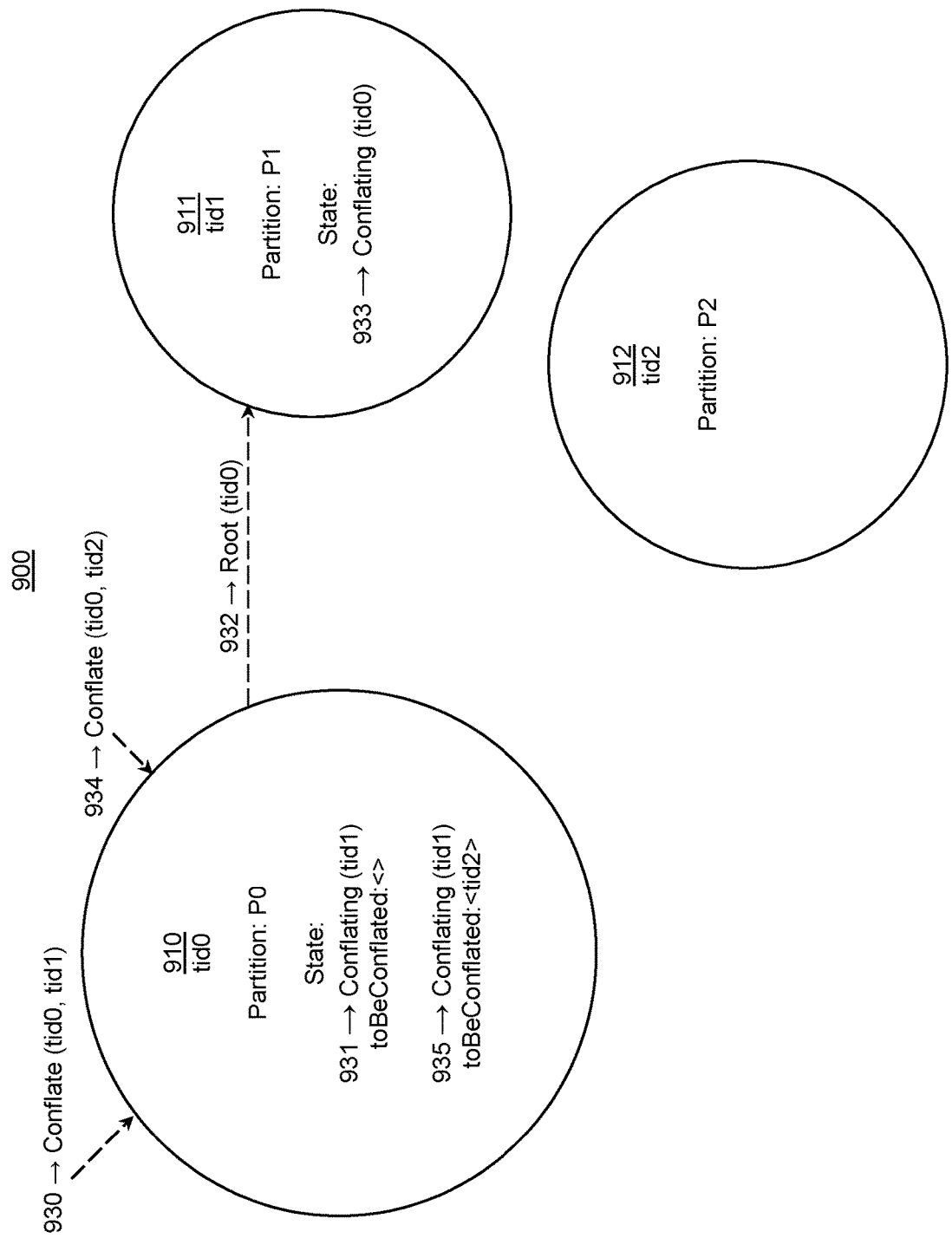
FIG. 9 illustrates a block diagram of an exemplary subgraph having nodes distributed across partitions of a distributed system, and showing a sequence of messages and state changes initiated by concurrent conflation events received at node.

Turning ahead in the drawings, FIG. 9 illustrates a block diagram of an exemplary subgraph 900 having nodes 910-912 distributed across partitions of a distributed system, and showing a sequence of messages and state changes initiated by concurrent conflation events received at node 910. Subgraph 900 is merely exemplary, and examples of subgraphs are not limited to those examples shown herein. The subgraphs can involve other configurations than those specifically depicted or described herein. In some embodiments, the procedures, the processes, and/or the activities of shown in FIG. 9 can be performed in the order presented. In other embodiments, the procedures, the processes, and/or the activities shown in FIG. 9 can be performed in another suitable order. In still other embodiments, one or more of the procedures, the processes, and/or the activities shown in FIG. 9 can be combined or skipped. In many embodiments, the procedures, processes, and/or the activities shown in FIG. 9 can be implemented on distributed system 310 (FIG. 3).

In a number of embodiments, node 910 can be a parent node of a first subgraph of subgraph 900. In several embodiments, node 910 can represent a tid labeled tid0, and can be stored on a partition P0, which can be one of the multiple processing nodes (e.g., 311-314 (FIG. 3)). Node 911 can be a parent node of a second subgraph of subgraph 900. In several embodiments, node 911 can represent a tid labeled tid1, and can be stored on a partition P1, which can be another of the multiple processing nodes (e.g., 311-314 (FIG. 3)). Node 912 can be a parent node of third subgraph of subgraph 900. In several embodiments, node 912 can represent a tid labeled tid2, and can be stored on a partition P2, which can be another of the multiple processing nodes (e.g., 311-314 (FIG. 3)). In many embodiments, node 910 can include a tgid that stores the data for node 910 on partition P0, node 911 can include a tgid that stores the data for node 911 on partition P1, and/or node 912 can include a tgid that stores the data for node 912 on partition P2. The subgraphs each separately includes a different one of nodes 910-912 can be disjoint sets. Nodes 910-912 can be nodes that represent a single user (e.g., 350 (FIG. 3)), such that it can be advantageous to conflate the three subgraphs into a single, unified subgraph. Nodes 910-912 each can be similar to nodes 710-711 (FIG. 7) and/or nodes 810-811 (FIG. 8).

In a number of embodiments, a conflation event 930 can be received at partition P0. Conflation event 930 can specify tid0 and tid1, which can be a request to combine nodes 910 and 911 into a single, unified subgraph. In many embodiments, when conflation event 930 is received at partition P0, conflation event 930 can be stored in a queue in a Kafka cluster at partition P0, and then can be processed by a Kafka Streams application at partition P0. Conflation event 930 can be processed at partition P0 by performing a state change 931 of a state of node 910 (tid0) from a normal state to a conflating state, and can store that the conflating is being performed with tid1, which collectively can indicate that tid0 is in an on-going conflation with tid1. In many embodiments, node 910 (tid0) can store a list of on-hold conflation events in a toBeConflated list, which at this point can be empty, as conflation event 930 is being processed. In a number of embodiments, node 910 (tid0) can send to node 911 (tid1) a root event 932 that specifies tid0, which can indicate that tid0 wants to conflate with tid1.

In several embodiments, root event 932 can be received at partition P1. In many embodiments, when root event 932 is received at partition P1, root event 932 can be stored in a queue in a Kafka cluster at partition P1, and then can be processed by a Kafka Streams application at partition P1. Root event 932 can begin to be processed at partition P1 by performing a state change 933 that changes the state of node 911 (tid1) from a normal state to a conflating state and storing that the conflating is being performed with tid0, which collectively can indicate that tid1 is in an on-going conflation with tid0.

In a number of embodiments, while conflation event 930 is being processed, such as described, for example, a second conflation event, conflation event 934 can be received at partition P0. Conflation event 934 can indicate tid0 and tid2, which can be a request to combine nodes 910 and 912 into a single, unified subgraph. In many embodiments, when conflation event 934 is received at partition P0, conflation event 934 can be stored in the queue in the Kafka cluster at partition P0, and then can be processed by the Kafka Streams application at partition P0. Conflation event 934 can be handled at partition P0 by determining that node 910 (tid0) is already in the conflating state, and performing a state change 935 of adding conflation event 934 to the list of on-hold conflation events in the toBeConflated list, while maintaining the state of node 910 (tid0) as the conflating state. Any additional conflation events received at node 910 (tid0) while the state of node 910 (tid0) is conflating can be similarly added to the list of on-hold conflation events. Processing of the conflation event 930 can proceed, similar to the process shown in FIG. 7 and/or FIG. 8, and described above. Once the state of node 910 (tid0) has returned to normal when the processing of conflation event 930 has completed, node 910 (tid0) can process, one at a time, any on-hold conflation events stored in node 910 (tid0). In such manner, when conflation events are received concurrently at a node (e.g., while processing of conflation events received at the node is still in process), such concurrent conflation events can beneficially be handled.

In many embodiments, block 620 (FIG. 6) of conflating the first set and the second set into a conflated set can begin to be implemented as shown in FIG. 9. The first node can be similar or identical to node 910 (tid0), and/or the second node can be similar or identical to node 911 (tid1). In several embodiments, the first conflation event can be received at the first processing node. The first conflation event can be similar or identical to conflation event 930. In a number of embodiments, block 620 (FIG. 6) conflating the first set and the second set into the conflated set further can include various activities. The activities can include changing a state of the first node to a conflating state based on the first conflation event, which can be similar or identical to state change 931. The activities also can include receiving, while the state of the first node is the conflating state, a second conflation event at the first processing node identifying the first node and a third node. The third node can be similar or identical to node 912 (tid2). The second conflation event can be similar or identical to conflation event 934. The activities additionally can include adding the second conflation event to a to-be-conflated queue at the first node. The to-be-conflated queue can be similar or identical to the toBeConflated list for node 910 (tid0) described above. The activities further can include, when the state of the first node changes to a normal state, changing a state of the first node to the conflating state based on the second conflation event, to process the second conflation event.

Figure 10:
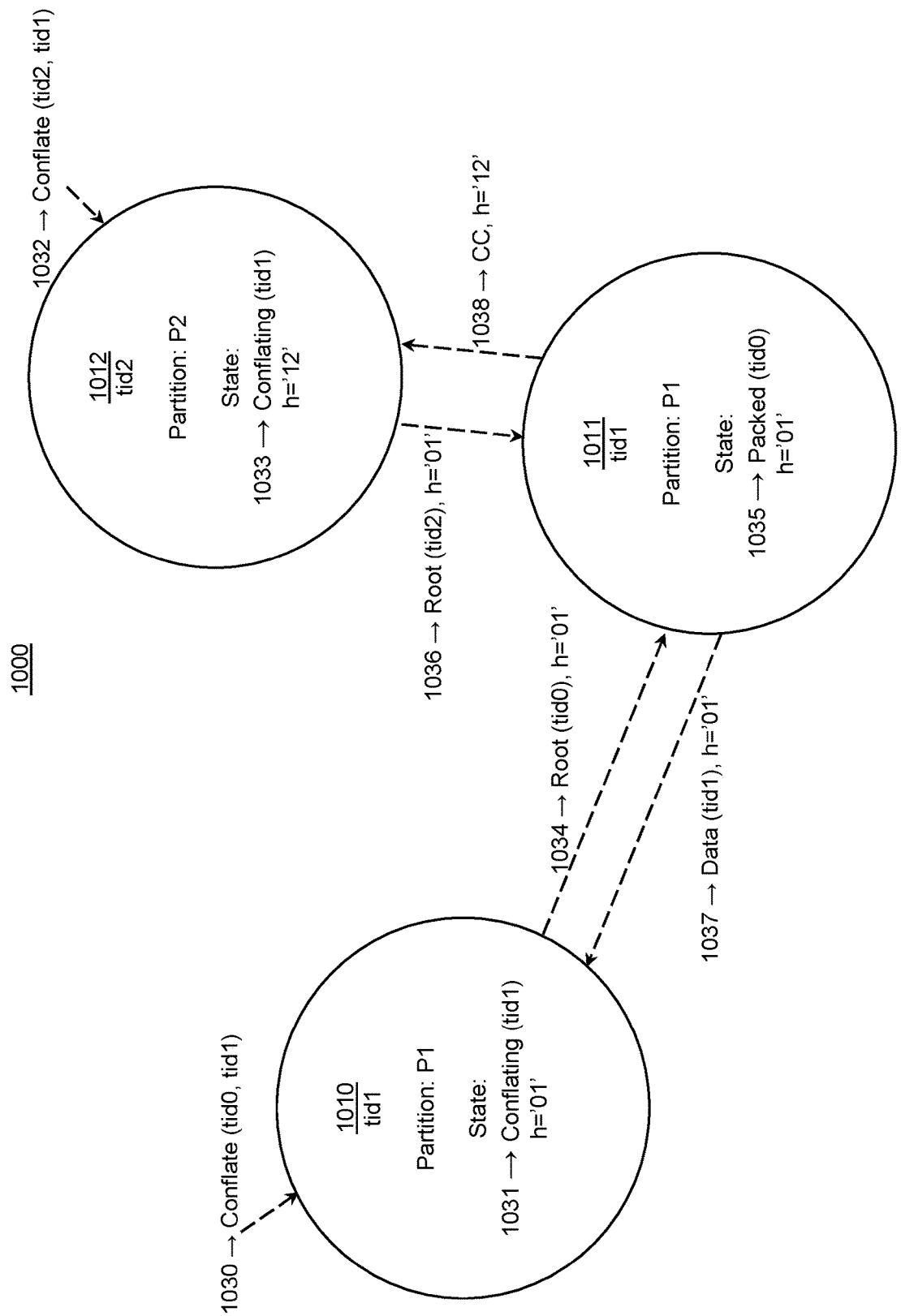
FIG. 10 illustrates a block diagram of an exemplary subgraph having nodes distributed across partitions of a distributed system, and showing a sequence of messages and state changes initiated by concurrent conflation events received at different nodes.

Turning ahead in the drawings, FIG. 10 illustrates a block diagram of an exemplary subgraph 1000 having nodes 1010-1012 distributed across partitions of a distributed system, and showing a sequence of messages and state changes initiated by concurrent conflation events received at different nodes (e.g., nodes 1010 and 1012). Subgraph 1000 is merely exemplary, and examples of subgraphs are not limited to those examples shown herein. The subgraphs can involve other configurations than those specifically depicted or described herein. In some embodiments, the procedures, the processes, and/or the activities of shown in FIG. 10 can be performed in the order presented. In other embodiments, the procedures, the processes, and/or the activities shown in FIG. 10 can be performed in another suitable order. In still other embodiments, one or more of the procedures, the processes, and/or the activities shown in FIG. 10 can be combined or skipped. In many embodiments, the procedures, processes, and/or the activities shown in FIG. 10 can be implemented on distributed system 310 (FIG. 3).

Subgraph 1000 can be similar or identical to subgraph 900 (FIG. 9) at the beginning before a conflation event is received. In a number of embodiments, node 1010 can be a parent node of a first subgraph of subgraph 1000. In several embodiments, node 1010 can represent a tid labeled tid0, and can be stored on a partition P0, which can be one of the multiple processing nodes (e.g., 311-314 (FIG. 3)). Node 1011 can be a parent node of a second subgraph of subgraph 1000. In several embodiments, node 1011 can represent a tid labeled tid1, and can be stored on a partition P1, which can be another of the multiple processing nodes (e.g., 311-314 (FIG. 3)). Node 1012 can be a parent node of third subgraph of subgraph 1000. In several embodiments, node 1012 can represent a tid labeled tid2, and can be stored on a partition P2, which can be another of the multiple processing nodes (e.g., 311-314 (FIG. 3)). In many embodiments, node 1010 can include a tgid that stores the data for node 1010 on partition P0, node 1011 can include a tgid that stores the data for node 1011 on partition P1, and/or node 1012 can include a tgid that stores the data for node 1012 on partition P2. The subgraphs each separately includes a different one of nodes 1010-1012 can be disjoint sets. Nodes 1010-1012 can be nodes that represent a single user (e.g., 350 (FIG. 3)), such that it can be advantageous to conflate the three subgraphs into a single, unified subgraph. Nodes 1010-1012 can be similar or identical to nodes 910-912 (FIG. 9), respectively.

In a number of embodiments, a conflation event 1030 can be received at partition P0. Conflation event 1030 can specify tid0 and tid1, which can be a request to combine nodes 1010 and 1011 into a single, unified subgraph. In many embodiments, when conflation event 1030 is received at partition P0, conflation event 1030 can be stored in a queue in a Kafka cluster at partition P0, and then can be processed by a Kafka Streams application at partition P0. Conflation event 1030 can be processed at partition P0 by performing a state change 1031 of a state of node 1010 (tid0) from a normal state to a conflating state, and can store that the conflating is being performed with tid1, which collectively can indicate that tid0 is in an on-going conflation with tid1. In many embodiments, a conflation identifier can be determined for each conflation event, which can be used to make concurrent conflation events serializable across partitions. For example, a hash function can be applied to the two nodes indicated in the conflation event (e.g., 1030). In a number of embodiments, the murmur2_hash function can be applied, as follows:

$$ConflationID = \begin{cases} \text{murmur2\_hash}(tidX, tidY), & tidX \leq tidY \\ \text{murmur2\_hash}(tidY, tidX), & tidX > tidY \end{cases}$$

where ConflationID is the conflation identifier for a conflation event, and tidX and tidY are the nodes indicated by the conflation event. If tid0 is lexicographically smaller than (or equal to) tid1, then the hash can be performed based with tid0 as the first argument and tid1 as the second argument input into the hash function, which can be denoted as h='01', and this conflation identifier can be stored along with the conflating state in node 1010 (tid0).

In a number of embodiments, while conflation event 1030 is being processed, such as described, for example, a second conflation event, conflation event 1032 can be received at a different partition, such as partition P2, for example. Conflation event 1032 can specify tid2 and tid1, which can be a request to combine nodes 1012 and 1011 into a single, unified subgraph. In many embodiments, when conflation event 1032 is received at partition P2, conflation event 1032 can be stored in a queue in a Kafka cluster at partition P2, and then can be processed by a Kafka Streams application at partition P2. Conflation event 1032 can be processed at partition P2 by performing a state change 1033 of a state of node 1012 (tid2) from a normal state to a conflating state, and can store that the conflating is being performed with tid1, which collectively can indicate that tid2 is in an on-going conflation with tid1. In many embodiments, a conflation identifier can be determined for conflation event 1032, similarly as described above for conflation event 1030. If tid1 is lexicographically smaller than (or equal to) tid2, then the hash can be performed based with tid1 as the first argument and tid2 as the second argument input into the hash function, which can be denoted as h='12', and this conflation identifier can be stored along with the conflating state in node 1012 (tid2).

In a number of embodiments, node 1010 (tid0) can send to node 1011 (tid1) a root event 1034 that specifies tid0, which can indicate that tid0 wants to conflate with tid1, and the conflation identifier, h='01'. In several embodiments, root event 1034 can be received at partition P1. In many embodiments, when root event 1034 is received at partition P1, root event 1034 can be stored in a queue in a Kafka cluster at partition P1, and then can be processed by a Kafka Streams application at partition P1. Root event 1034 can begin to be processed at partition P1 by performing a state change 1035 that changes the state of node 1011 (tid1) from a normal state to a packed state and can store that the packing is being performed with tid0, which can indicate that tid1 is packing and sending the data in its associated tgid to another root node, namely tid0. In many embodiments, the conflation identifier of h='01' also can be stored with the packed state. In a number of embodiments, node 1011 (tid1) can send to node 1010 (tid0) a data event 1037 that includes the data in the tgid for node 1011 (tid1), such as the data for node 1011 (tid1).

Meanwhile, based on conflation event 1032 being received concurrently at node 1032, in a number of embodiments, node 1012 (tid2) can send to node 1011 (tid1) a root event 1036 that specifies tid2, which can indicate that tid2 wants to conflate with tid1, and the conflation identifier, h='12'. In several embodiments, root event 1036 can be received at partition P1. In many embodiments, when root event 1036 is received at partition P1, root event 1036 can be stored in a queue in the Kafka cluster at partition P1, and then can be processed by the Kafka Streams application at partition P1. Because node 1011 (tid1) on partition P1 is already handling a different conflation event; and/or the state of tid1 is other than the normal state, and the node specified by root event 1036 is not the same as a node specified in a conflation state, if any, at node 1011 (tid1), node 1011 can send to node 1012 (tid2) a concurrent conflation event 1038 that includes the conflation identifier h='12'.

In several embodiments, concurrent conflation event 1038 can be received at partition P2. In many embodiments, when concurrent conflation event 1038 is received at partition P2, concurrent conflation event 1038 can be stored in the queue in the Kafka cluster at partition P2, and then can be processed by the Kafka Streams application at partition P2. Concurrent conflation event 1038 can be handled at partition P2 by using a retry mechanism, which can retry sending root event 1036 from node 1012 (tid2) to node 1011 (tid1), and if concurrent conflation event 1038 is again received, retrying again, up to a predetermined number of retries, such as 100 times, for example, or another suitable number of retries. After the retry limit is reached, the state of the respective node can return to the normal state. Processing of conflation event 1030 can proceed, similar to the process shown in FIG. 7 and/or FIG. 8, and described above, while the retries are attempted. In some embodiments, node 1012 (tid2) can wait for a predetermined delay period between each retry attempt. Once the state of node 1011 (tid1) changes to the normal state, the next retry can result in node 1011 (tid1) handling root event 1036. Processing of conflation event 1033 can then proceed, similar to the process shown in FIG. 7 and/or FIG. 8, and described above.

In many embodiments, block 620 (FIG. 6) of conflating the first set and the second set into a conflated set can begin to be implemented as shown in FIG. 10. The first node can be similar or identical to node 1010 (tid0), and/or the second node can be similar or identical to node 1011 (tid1). In many embodiments, the first node can be the sole parent node of the first set, and/or the second node can be the sole parent node of the second set. In several embodiments, the first conflation event can be received at the first processing node. The first conflation event can be similar or identical to conflation event 1030. In a number of embodiments, block 620 (FIG. 6) conflating the first set and the second set into the conflated set further can include various activities.

The activities can include changing a state of the first node to a conflating state based on the first conflation event, which can be similar or identical to state change 1031. The activities also can include determining, at the first node, a first conflation hash identifier for the first conflation event, which can be similar or identical to the conflation identified for h='01'. The activities additionally can include receiving, while the state of the first node is the conflating state, a second conflation event at a third processing node identifying the second node and a third node. The third node can be similar or identical to node 1012 (tid2). The third processing node can be similar or identical to partition P2. In a number of embodiment, the third node can be stored at the third processing node. In several embodiments, the third node can be a sole parent node of a third set. In many embodiments, the first set, the second set, and the third set can be disjoint sets.

The activities further can include changing a state of the third node to the conflating state based on the second conflation event, which can be similar or identical to state change 1033. The activities additionally can include determining, at the third node, a second conflation hash identifier for the second conflation event, which can be similar or identical to the conflation identifier for h='12'. The activities further can include sending, from the first node to the second node, a first root event identifying the first node and the first conflation hash identifier, which can be similar or identical to root event 1034. The activities additionally can include determining, at the second node, that the first node is lexicographically smaller than the second node. The activities further can include changing a state of the second node to a packed state, which can be similar or identical to state change 1035. The activities additionally can include sending, from the third node to the second node, a second root event identifying the third node and the second conflation hash identifier, which can be similar or identical to root event 1036. The activities further can include sending, from the second node to the first node, a data event comprising the data for the second node, which can be similar or identical to data event 1037. The activities additionally can include sending, from the second node to the third node, a concurrent conflation event comprising the second conflation hash identifier, which can be similar or identical to concurrent conflation event 1038. The activities further can include sending one or more retries up to a retry limit, from the third node to the second node, for the second root event. The activities additionally can include, when the state of the second node changes to a normal state and one of the one or more retries is received at the second node, changing a state of the second node to the conflating state based on the second conflation event, to process the second conflation event.

Figure 11:
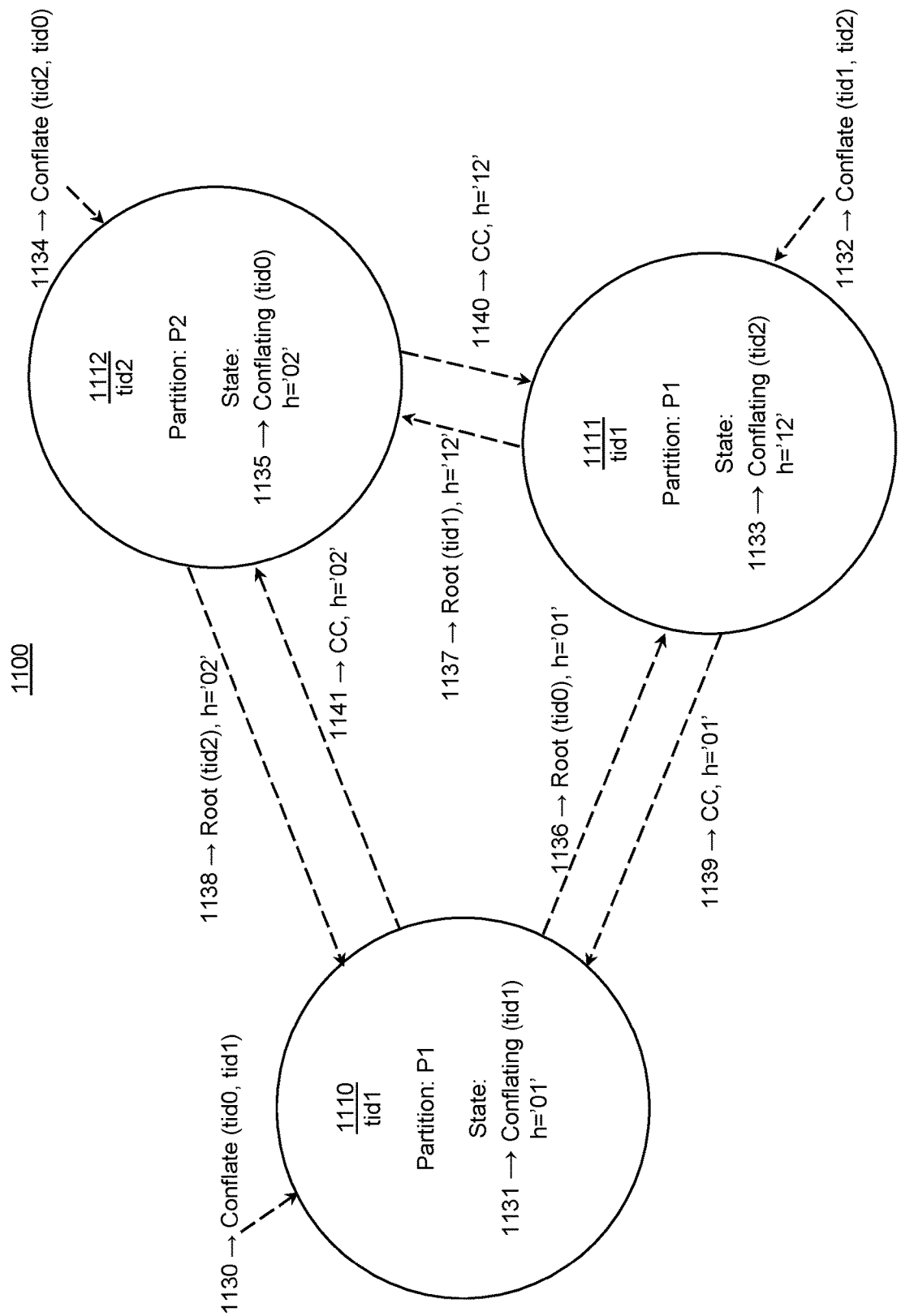
FIG. 11 illustrates a block diagram of an exemplary subgraph having nodes distributed across partitions of a distributed system, and showing a sequence of messages and state changes initiated by concurrent conflation events received at three different nodes.

Turning ahead in the drawings, FIG. 11 illustrates a block diagram of an exemplary subgraph 1100 having nodes 1110-1112 distributed across partitions of a distributed system, and showing a sequence of messages and state changes initiated by concurrent conflation events received at three different nodes (e.g., nodes 1110, 1111, and 1112). Subgraph 1100 is merely exemplary, and examples of subgraphs are not limited to those examples shown herein. The subgraphs can involve other configurations than those specifically depicted or described herein. In some embodiments, the procedures, the processes, and/or the activities of shown in FIG. 11 can be performed in the order presented. In other embodiments, the procedures, the processes, and/or the activities shown in FIG. 11 can be performed in another suitable order. In still other embodiments, one or more of the procedures, the processes, and/or the activities shown in FIG. 11 can be combined or skipped. In many embodiments, the procedures, processes, and/or the activities shown in FIG. 11 can be implemented on distributed system 310 (FIG. 3).

Subgraph 1100 can be similar or identical to subgraph 900 (FIG. 9) and/or subgraph 1000 (FIG. 10) at the beginning before a conflation event is received. In a number of embodiments, node 1110 can be a parent node of a first subgraph of subgraph 1100. In several embodiments, node 1110 can represent a tid labeled tid0, and can be stored on a partition P0, which can be one of the multiple processing nodes (e.g., 311-314 (FIG. 3)). Node 1111 can be a parent node of a second subgraph of subgraph 1100. In several embodiments, node 1111 can represent a tid labeled tid1, and can be stored on a partition P1, which can be another of the multiple processing nodes (e.g., 311-314 (FIG. 3)). Node 1112 can be a parent node of third subgraph of subgraph 1100. In several embodiments, node 1112 can represent a tid labeled tid2, and can be stored on a partition P2, which can be another of the multiple processing nodes (e.g., 311-314 (FIG. 3)). In many embodiments, node 1110 can include a tgid that stores the data for node 1110 on partition P0, node 1111 can include a tgid that stores the data for node 1111 on partition P1, and/or node 1112 can include a tgid that stores the data for node 1112 on partition P2. The subgraphs each separately includes a different one of nodes 1110-1112 can be disjoint sets. Nodes 1110-1112 can be nodes that represent a single user (e.g., 350 (FIG. 3)), such that it can be advantageous to conflate the three subgraphs into a single, unified subgraph. Nodes 1110-1112 can be similar or identical to nodes 910-912 (FIG. 9), respectively, and/or nodes 1010-1012 (FIG. 10, respectively.

In a number of embodiments, a conflation event 1130 can be received at partition P0. Conflation event 1130 can specify tid0 and tid1, which can be a request to combine nodes 1110 and 1111 into a single, unified subgraph. In many embodiments, when conflation event 1130 is received at partition P0, conflation event 1130 can be stored in a queue in a Kafka cluster at partition P0, and then can be processed by a Kafka Streams application at partition P0. Conflation event 1130 can be processed at partition P0 by performing a state change 1131 of a state of node 1110 (tid0) from a normal state to a conflating state, and can store that the conflating is being performed with tid1, which collectively can indicate that tid0 is in an on-going conflation with tid1. In many embodiments, a conflation identifier can be determined for conflation event 1130, similarly as described above for conflation events 1030 and 1032 (FIG. 10). If tid0 is lexicographically smaller than (or equal to) tid1, then the hash can be performed based with tid0 as the first argument and tid1 as the second argument input into the hash function, which can be denoted as h='01', and this conflation identifier can be stored along with the conflating state in node 1110 (tid0).

Meanwhile, in a number of embodiments, while conflation event 1130 is being processed, such as described, for example, a second conflation event, conflation event 1132 can be received at a different partition, such as partition P1, for example. Conflation event 1132 can specify tid1 and tid2, which can be a request to combine nodes 1111 and 1112 into a single, unified subgraph. In many embodiments, when conflation event 1132 is received at partition P1, conflation event 1132 can be stored in a queue in a Kafka cluster at partition P1, and then can be processed by a Kafka Streams application at partition P1. Conflation event 1132 can be processed at partition P1 by performing a state change 1133 of a state of node 1111 (tid1) from a normal state to a conflating state, and can store that the conflating is being performed with tid2, which collectively can indicate that tid1 is in an on-going conflation with tid2. In many embodiments, a conflation identifier can be determined for conflation event 1132, similarly as described above for conflation event 1130. If tid1 is lexicographically smaller than (or equal to) tid2, then the hash can be performed based with tid1 as the first argument and tid2 as the second argument input into the hash function, which can be denoted as h='12', and this conflation identifier can be stored along with the conflating state in node 1111 (tid1).

Meanwhile, in a number of embodiments, while conflation events 1130 and 1132 are being processed, such as described, for example, a third conflation event, conflation event 1134 can be received at a different partition, such as partition P2, for example. Conflation event 1134 can specify tid2 and tid0, which can be a request to combine nodes 1112 and 1110 into a single, unified subgraph. In many embodiments, when conflation event 1134 is received at partition P2, conflation event 1134 can be stored in a queue in a Kafka cluster at partition P2, and then can be processed by a Kafka Streams application at partition P2. Conflation event 1134 can be processed at partition P2 by performing a state change 1135 of a state of node 1112 (tid2) from a normal state to a conflating state, and can store that the conflating is being performed with tid0, which collectively can indicate that tid2 is in an on-going conflation with tid0. In many embodiments, a conflation identifier can be determined for conflation event 1134, similarly as described above for conflation events 1130 and/or 1132. If tid0 is lexicographically smaller than (or equal to) tid2, then the hash can be performed based with tid0 as the first argument and tid2 as the second argument input into the hash function, which can be denoted as h='02', and this conflation identifier can be stored along with the conflating state in node 1112 (tid2).

In a number of embodiments, based on conflation event 1130, node 1110 (tid0) can send to node 1111 (tid1) a root event 1136 that specifies tid0, which can indicate that tid0 wants to conflate with tid1, and the conflation identifier, h='01'. In several embodiments, root event 1136 can be received at partition P1. In many embodiments, when root event 1136 is received at partition P1, root event 1136 can be stored in a queue in the Kafka cluster at partition P1, and then can be processed by the Kafka Streams application at partition P1. Because node 1111 (tid1) on partition P1 is already handling a different conflation event; and/or the state of tid1 is other than the normal state, and the node specified by root event 1136 (i.e., tid0) is not the same as a node specified in a conflation state at node 1111 (i.e., tid2), node 1111 can send to node 1110 (tid0) a concurrent conflation event 1139 that includes the conflation identifier h='01'.

Meanwhile, based on conflation event 1132, in a number of embodiments, node 1111 (tid1) can send to node 1112 (tid2) a root event 1137 that specifies tid1, which can indicate that tid1 wants to conflate with tid2, and the conflation identifier, h='12'. In several embodiments, root event 1137 can be received at partition P2. In many embodiments, when root event 1137 is received at partition P2, root event 1137 can be stored in a queue in the Kafka cluster at partition P2, and then can be processed by the Kafka Streams application at partition P2. Because node 1112 (tid2) on partition P2 is already handling a different conflation event; and/or the state of tid2 is other than the normal state, and the node specified by root event 1137 (i.e., tid1) is not the same as a node specified in a conflation state at node 1112 (i.e., tid0), node 1111 can send to node 1111 (tid1) a concurrent conflation event 1140 that includes the conflation identifier h='12'.

Meanwhile, based on conflation event 1134, in several embodiments, node 1112 (tid2) can send to node 1110 (tid0) a root event 1138 that specifies tid2, which can indicate that tid2 wants to conflate with tid0, and the conflation identifier, h='02'. In several embodiments, root event 1138 can be received at partition P0. In many embodiments, when root event 1138 is received at partition P0, root event 1138 can be stored in a queue in the Kafka cluster at partition P0, and then can be processed by the Kafka Streams application at partition P0. Because node 1110 (tid0) on partition P0 is already handling a different conflation event; and/or the state of tid0 is other than the normal state, and the node specified by root event 1138 (i.e., tid2) is not the same as a node specified in a conflation state at node 1110 (i.e., tid1), node 1110 can send to node 1112 (tid2) a concurrent conflation event 1141 that includes the conflation identifier h='02'.

In several embodiments, concurrent conflation event 1139 can be received at partition P0, concurrent conflation event 1140 can be received at partition P1, and/or concurrent conflation event 1141 can be received at partition P2. In many embodiments, when the concurrent conflation event (e.g., 1139-141) is received at the respective partition (e.g., P0-P2), the concurrent conflation event can be stored in the queue in the Kafka cluster at the respective partition, and then can be processed by the Kafka Streams application at the respective partition. The concurrent conflation event can be handled at the respective partition by using a retry mechanism, which can be similar to the retry mechanism described above with respect to concurrent conflation event 1038 (FIG. 10). If the retry limit is the same at all of the nodes, the processing can get stuck in a cyclic deadlock. Therefore, in a number of embodiments, the retry limit can be randomized to overcome cyclic deadlocks. For example, the retry limit at each of the nodes can be randomly selected within a suitable range, such as a range between 10 and 100. In some embodiments, the respective node can wait for a predetermined delay period between each retry attempt. After the retry limit is reached, the state of the respective node can return to the normal state. Based on the randomization, if the number of retries by node 1110 for root event 1136 is n1, the number of retries by node 1111 for root event 1137 is n2, and the number of retries by node 1112 for root event 1138 is n3, in which n1<n2<n3, the cyclic deadlock can resolve after n1 loops of root event 1136 followed by concurrent conflation event 1139.

Figure 12:
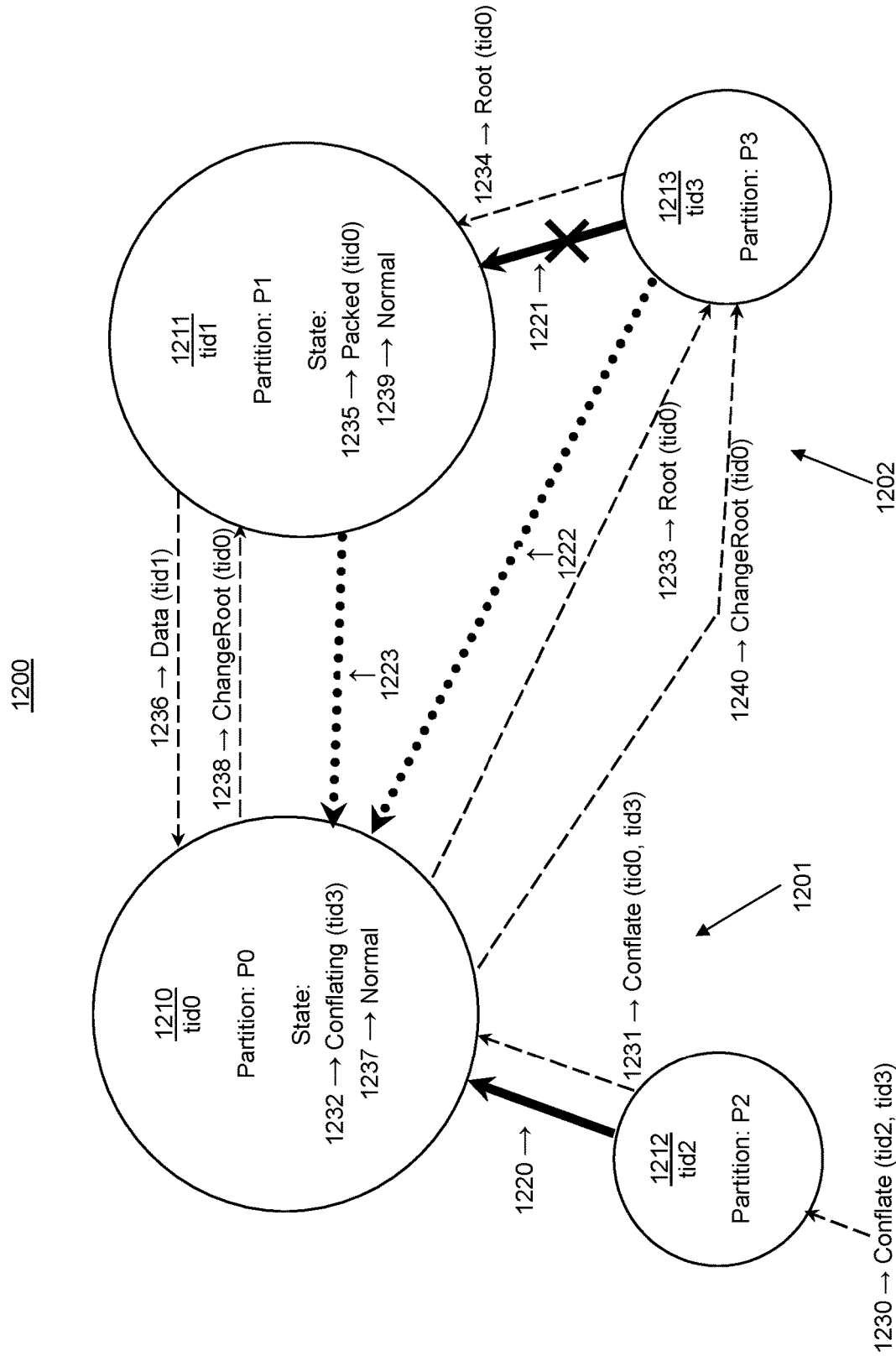
FIG. 12 illustrates a block diagram of an exemplary subgraph having nodes distributed across partitions of a distributed system, and showing a sequence of messages and state changes that cause a conflation of two subgraphs into a single subgraph when a conflation event is received at a child node.

Turning ahead in the drawings, FIG. 12 illustrates a block diagram of an exemplary subgraph 1200 having nodes 1210-1213 distributed across partitions of a distributed system, and showing a sequence of messages and state changes that cause a conflation of two subgraphs into a single subgraph when a conflation event is received at a child node 1212. Subgraph 1200 is merely exemplary, and examples of subgraphs are not limited to those examples shown herein. The subgraphs can involve other configurations than those specifically depicted or described herein. In some embodiments, the procedures, the processes, and/or the activities of shown in FIG. 12 can be performed in the order presented. In other embodiments, the procedures, the processes, and/or the activities shown in FIG. 12 can be performed in another suitable order. In still other embodiments, one or more of the procedures, the processes, and/or the activities shown in FIG. 12 can be combined or skipped. In many embodiments, the procedures, processes, and/or the activities shown in FIG. 12 can be implemented on distributed system 310 (FIG. 3).

Subgraph 1200 can be similar or identical to subgraph 700 (FIG. 7) at the beginning before a conflation event is received. In a number of embodiments, node 1210 can be a parent node of a first subgraph 1201 of subgraph 1200. In several embodiments, node 1210 can represent a tid labeled tid0, and can be stored on a partition P0, which can be one of the multiple processing nodes (e.g., 311-314 (FIG. 3)). Node 1211 can be a parent node of a second subgraph 1202 of subgraph 1200. In several embodiments, node 1211 can represent a tid labeled tid1, and can be stored on a partition P1, which can be another of the multiple processing nodes (e.g., 311-314 (FIG. 3)). Node 1212 can be a child node of first subgraph 1201 of subgraph 1200 that is mapped to node 1210, as represented by a mapping 1220. In several embodiments, node 1212 can represent a tid labeled tid2, and can be stored on a partition P2, which can be another of the multiple processing nodes (e.g., 311-314 (FIG. 3)). Node 1213 can be a child node of second subgraph 1202 of subgraph 1200 that is mapped to node 1211, as represented by a mapping 1221. In several embodiments, node 1213 can represent a tid labeled tid3, and can be stored on a partition P3, which can be another of the multiple processing nodes (e.g., 311-314 (FIG. 3)). In many embodiments, node 1210 can include a tgid that stores the data for nodes 1210 and 1212 on partition P0, and/or node 1211 can include a tgid that stores the data for nodes 1211 and 1213 on partition P1. Subgraphs 1201 and 1202 can be disjoint sets. Nodes 1210-1213 can be nodes that represent a single user (e.g., 350 (FIG. 3)), such that it can be advantageous to conflate subgraphs 1201 and 1202 into a single, unified subgraph. Nodes 1210-1213 can be similar or identical to nodes 710-713 (FIG. 7), respectively, subgraphs 1201-1202 can be similar or identical to subgraphs 701-702 (FIG. 7), respectively, and/or mappings 1220-1221 can be similar or identical to mappings 720-721 (FIG. 7), respectively.

In a number of embodiments, a conflation event 1230 can be received at partition P2. Conflation event 1230 can specify tid2 and tid3, which can be a request to combine nodes 1212 and 1213 into a single, unified subgraph. In many embodiments, when conflation event 1230 is received at partition P2, conflation event 1230 can be stored in a queue in a Kafka cluster at partition P2, and then can be processed by a Kafka Streams application at partition P2. In many embodiments, when a conflation event (e.g., 1230) is received at a child node, the conflation event can be routed to the parent node to which the child is mapped, replacing the specified child node with the parent node. Conflation event 1230 can be processed at partition P2 by determining that node 1212 (tid2) is a child node of node 1210 (tid0), which can result in node 1212 sending a conflation event 1231 to partition P0, which specifies tid0 and tid3.

In many embodiments, conflation event 1231 can be received at partition P0. Conflation event 1231 can specify tid0 and tid3, which can be a request to combine nodes 1210 and 1213 into a single, unified subgraph. In many embodiments, when conflation event 1231 is received at partition P0, conflation event 1231 can be stored in a queue in a Kafka cluster at partition P0, and then can be processed by a Kafka Streams application at partition P0. Conflation event 1231 can be processed at partition P0 by performing a state change 1232 of a state of node 1210 (tid1) from a normal state to a conflating state, and can store that the conflating is being performed with tid3, which collectively can indicate that tid0 is in an on-going conflation with tid3. In a number of embodiments, node 1210 (tid0) can send to node 1213 (tid3) a root event 1233 that specifies tid0, which can indicate that tid0 wants to conflate with tid3.

In several embodiments, root event 1233 can be received at partition P3. In many embodiments, when root event 1233 is received at partition P3, root event 1233 can be stored in a queue in a Kafka cluster at partition P3, and then can be processed by a Kafka Streams application at partition P3. In many embodiments, when a root event (e.g., 1233) is received at a child node, the root event can be routed to the parent node to which the child is mapped. Root event 1233 can be processed at partition P3 by determining that node 1213 (tid3) is a child node of node 1211 (tid1), which can result in node 1213 sending a root event 1234 to partition P1, which specifies tid0, which can indicate that tid0 wants to conflate with tid1.

In a number of embodiments, root event 1234 can be received at partition P1. In many embodiments, when root event 1234 is received at partition P1, root event 1234 can be stored in a queue in a Kafka cluster at partition P1, and then can be processed by a Kafka Streams application at partition P1. Root event 1234 can be processed at partition P1 by comparing parent nodes (root nodes) tid0 and tid1, to determine which node is lexicographically smaller, which in this case can be tid0, such that tid0 should be the new parent node (root). In many embodiments, node 1211 (tid1) can perform a state change 1235 by changing its state from the conflating state to a packed state and can store that the packing is being performed with tid0, which can indicate that tid1 is packing and sending the data in its associated tgid to another root node, namely tid0. In a number of embodiments, node 1211 (tid1) can send to node 1210 (tid0) a data event 1236 that includes the data in the tgid for node 1211 (tid1), such as the data for node 1211 (tid1) and node 1213 (tid3).

In several embodiments, data event 1236 can be received at partition P0. In many embodiments, when data event 1236 is received at partition P0, data event 1236 can be stored in the queue in the Kafka cluster at partition P0, and then can be processed by the Kafka Streams application at partition P0. Data event 1236 can be processed at partition P0 by unpacking the data in data event 1236 to obtain the data for node 1211 (tid1) and node 1213 (tid3), and this data can be stored locally in partition P0 in the tgid associated with tid0. In a number of embodiments, node 1210 (tid0) can perform a state change 1237 by changing its state from the conflating state to the normal state, which can indicate that tid0 now has the data for tid1 and tid3. In a number of embodiments, node 1210 (tid0) can send to node 1211 (tid1) a change root event 1238 specifying tid0, which can indicate that tid0 is now the parent node for node 1211 (tid1), and/or can send to node 1213 (tid3) a change root event 1240 specifying tid0, which can indicate that tid0 is now the parent node for node 1213 (tid3).

In several embodiments, change root event 1238 can be received at partition P1. In many embodiments, when change root event 1238 is received at partition P1, change root event 1238 can be stored in the queue in the Kafka cluster at partition P1, and then can be processed by the Kafka Streams application at partition P1. Change root event 1238 can be processed at partition P1 by node 1211 (tid1) deleting its stored data for node 1211 (tid1) and deleting its stored data for node 1213 (tid3). Node 1211 (tid1) also can change its parent to node 1210 (tid0), by creating a mapping 1223 from node 1211 (tid1) to node 1210 (tid0). Node 1211 additionally can perform a state change 1239 by changing its state from the packed state to the normal state, which can indicate that tid1 has finished conflating with tid0.

In a number of embodiments, change root event 1240 can be received at partition P3. In many embodiments, when change root event 1240 is received at partition P3, change root event 1240 can be stored in a queue in a Kafka cluster at partition P3, and then can be processed by a Kafka Streams application at partition P3. Change root event 1240 can be processed at partition P3 by node 1213 (tid3) changing its parent to node 1210 (tid0), which can be performed by creating a mapping 1222 from node 1213 (tid3) to node 1210 (tid0), and deleting mapping 1221 from node 1213 (tid3) to node 1211 (tid1).

Although the events processed to handle conflation event 730 in FIG. 7 and conflation event 830 in FIG. 8 are somewhat different from the events processed to handle conflation event 1230 in FIG. 12, the final output is the same, such that the conflation event can be received at the parent node or a child node of a subgraph and result in the same conflated graph.

In many embodiments, block 620 (FIG. 6) of conflating the first set and the second set into a conflated set can be implemented as shown in FIG. 12. For example, the first node can be similar or identical to node 1212 (tid2), and/or the first set can be similar or identical to subgraph 1201. The first processing node can be similar or identical to partition P2. The second node can be similar or identical to node 1213 (tid3), and/or the second set can be similar or identical to subgraph 1202. The second processing node can be similar or identical to partition P3. In a number of embodiments, the first set further can include a third node. The third node can be similar or identical to node 1210 (tid0). In several embodiments, the third node can be stored at a third processing node of the multiple processing nodes. The third processing node can be similar or identical to partition P0. In various embodiments, the third node can be the sole parent node of the first set. In several embodiments, the second set further can include a fourth node. The fourth node can be similar or identical to node 1211 (tid1). In a number of embodiments, the fourth node can be stored at a fourth processing node of the multiple processing nodes. The fourth processing node can be similar or identical to partition P1. In many embodiments, the fourth node can be the sole parent node of the second set. In several embodiments, the first node can be a child node mapped to the third node, such as tid2 mapped to parent node tid0. In a number of embodiments, the second node can be a child node mapped to the fourth node, such as tid3 mapped to parent node tid1. In a number of embodiments, data for the first node and data for the third node can be stored at the third node. For example, the data for tid0 and tid2 can be stored in a tgid associated with tid0 in partition P0. In several embodiments, data for the second node and data for the fourth node can be stored at the fourth node. For example, the data for tid1 and tid3 can be stored in a tgid associated with tid1 in partition P1.

In many embodiments, the first conflation event can be received at the first processing node. For example, the first conflation event can be similar or identical to conflation event 1230. In a number of embodiments, block 620 (FIG. 6) of conflating the first set and the second set into the conflated set further can include various activities. The activities can include determining, at the first node, that a parent of the first node is the third node. The activities also can include sending, from the first node to the third node, a second conflation event identifying the third node and the second node. The second conflation event can be similar or identical to conflation event 1231. The activities additionally can include changing a state of the third node to a conflating state, which can be similar or identical to state change 1232. The activities further can include sending, from the third node to the second node, a first root event identifying the third node, which can be similar or identical to root event 1233. The activities additionally can include determining, at the second node, that a parent of the second node is the fourth node. The activities further can include sending, from the second node to the fourth node, a second root event identifying the third node, which can be similar or identical to root event 1234. The activities additionally can include determining, at the fourth node, that the third node is lexicographically smaller than the fourth node. The activities further can include changing a state of the fourth node to a packed state, which can be similar or identical to state change 1235. The activities additionally can include sending, from the fourth node to the third node, a data event comprising the data for the second node and the data for the fourth node, which can be similar or identical to data event 1236. The activities further can include storing the data for the second node and the data for the fourth node at the third node. The activities additionally can include changing the state of the third node to a normal state, which can be similar or identical to state change 1237. The activities further can include sending, from the third node to each of the second node and the fourth node, a change-root event identifying the third node, which can be similar or identical to change root event 1238 and/or change root event 1240. The activities additionally can include deleting the data for the second node and the data for the fourth node from the fourth node. The activities further can include setting the fourth node to be a child node mapped to the third node, which can be similar or identical to creating mapping 1223. The activities additionally can include changing the state of the fourth node to a normal state, which can be similar or identical to state change 1239. The activities further can include setting the second node to be a child node mapped to the third node, which can be similar or identical to creating mapping 1222 and/or deleting mapping 1221. The conflated set can be similar or identical to subgraph 1200, once the processing described above has completed. The sole parent node of the conflated set can be node 1210 (tid0).

Figure 13:
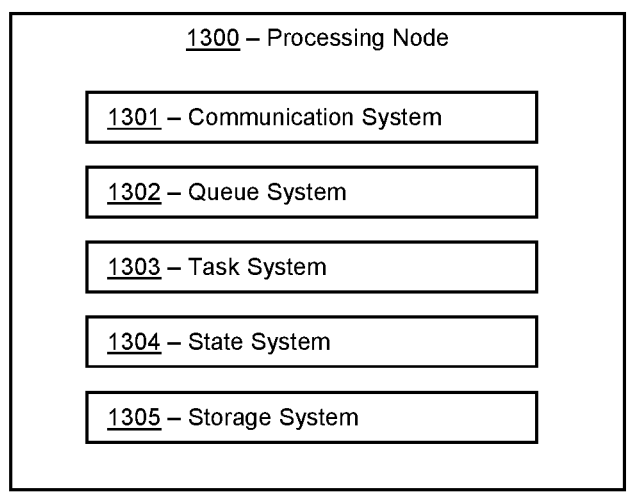
FIG. 13 illustrates a block diagram of a processing node that can be used to implement each of the processing nodes of FIG. 3.

Turning ahead in the drawings, FIG. 13 illustrates a block diagram of a processing node 1300 that can be used to implement each of processing nodes 311-314 (FIG. 3). Processing node 1300 is merely exemplary and embodiments of the processing node are not limited to the embodiments presented herein. The processing node can be employed in many different embodiments or examples not specifically depicted or described herein. In some embodiments, certain elements, modules, or systems of processing node 1300 can perform various procedures, processes, and/or activities. In other embodiments, the procedures, processes, and/or activities can be performed by other suitable elements, modules, or systems of processing node 1300.

Generally, therefore, processing node 1300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of processing node 1300 described herein.

In many embodiments, the systems of processing node 1300 can be modules of computing instructions (e.g., software modules) stored at non-transitory computer readable media that operate on one or more processors. In other embodiments, the systems of processing node 1300 can be implemented in hardware.

Processing node 1300 can be a computer system, such as computer system 100 (FIG. 1), as described above, and can be a single computer, a single server, or a cluster or collection of computers or servers, or a cloud of computers or servers. In another embodiment, a single computer system can host processing node 1300.

In several embodiments, processing node 1300 can include a communication system 1301, a queue system 1302, a task system 1303, a state system 1304, and/or a storage system 1305. In some embodiments, queue system 1302 can be implemented using a Kafka cluster, as described above. In a number of embodiments, task system 1303 and state system 1304 can be implemented using a Kafka Streams application, as described above.

In several embodiments, communication system 1301 can at least partially perform block 610 (FIG. 6) of receiving a first conflation event identifying a first node and a second node; and/or block 620 (FIG. 6) of conflating the first set and the second set into a conflated set. For example, sending and/or receiving events (e.g., conflation events, root events, change root events) at processing node 1300 can be performed by communication system 1301.

In several embodiments, queue system 1302 can at least partially perform block 610 (FIG. 6) of receiving a first conflation event identifying a first node and a second node; and/or block 620 (FIG. 6) of conflating the first set and the second set into a conflated set. For example, queue system 1302 can store events (e.g., conflation events, root events, change root events) that are received at and/or sent from processing node 1300.

In a number of embodiments, task system 1303 can at least partially perform block 610 (FIG. 6) of receiving a first conflation event identifying a first node and a second node; and/or block 620 (FIG. 6) of conflating the first set and the second set into a conflated set. For example, processing events (e.g., conflation events, root events, change root events) at processing node 1300 can be performed by task system 1303.

In several embodiments, state system 1304 can at least partially perform block 610 (FIG. 6) of receiving a first conflation event identifying a first node and a second node; and/or block 620 (FIG. 6) of conflating the first set and the second set into a conflated set. For example, state changes (e.g., from a normal state to a conflating state, from a normal state to a packed state, from a conflating state to a normal state, from a packed state to a normal state, and/or other suitable state changes) at processing node 1300 can be performed by state system 1304.

In a number of embodiments, storage system 1305 can at least partially perform block 620 (FIG. 6) of conflating the first set and the second set into a conflated set. For example, when data is stored in a processing node, such as data for tids stored in a tgid, storage system 13005 can store the data in processing node 1300.

In many embodiments, the techniques described herein can provide a practical application and several technological improvements. In some embodiments, the techniques described herein can perform event-driven identity graph conflation. These techniques described herein can provide an event-driven form of the Union-Find algorithm with Path Compression, which can provide multiple advantages over conventional request-response approaches. In event-driven processing, such as using Kafka clusters and Kafka Streams applications, the events can be handled asynchronously, such that processing an event does not block on-going event processing. In many embodiments, events can be serializable, such that the processing on between two nodes involves a single linkage between those nodes. A single connection among three nodes can be broken into smaller linkages of two nodes. In a number of embodiments, the event-driven processing can be eventually consistent. In many embodiments, the even-driven processing can be commutative. In several embodiments, the event-driven processing can be performed in real-time for each event. By performing the processing on a distributed system, large identity graphs containing subgraphs for a large number of users, such as more than a hundred million users, can be handled with conflating subgraphs for users spread across the processing nodes of the distributed system.

In a number of embodiments, the techniques described herein can solve a technical problem that arises only within the realm of computer networks, as identity graph data structures that do not exist outside the realm of computer networks. Moreover, the techniques described herein can solve a technical problem that cannot be solved outside the context of computer networks. Specifically, the techniques described herein cannot be used outside the context of computer networks, as they involve using multiple processing nodes.

Various embodiments can include a distributed system including multiple processing nodes. The distributed system can perform certain acts. The acts can include receiving a first conflation event identifying a first node and a second node. The first node can be part of a first set. The first set can include a sole parent node stored at a first processing node of the multiple processing nodes. The second node can be part of a second set. The second set can include a sole parent node stored at a second processing node of the multiple processing nodes. The first and second sets can be disjoint sets. The first conflation event can be received at an event-driven stream application at one of the multiple processing nodes. The acts also can include conflating the first set and the second set into a conflated set. The conflated set can include the first and second nodes. The conflated set can include a sole parent node. Data for each node of the conflated set can be stored at the sole parent node of the conflated set at a processing node of the multiple processing nodes.

A number of embodiments can include a method. The method can include receiving a first conflation event identifying a first node and a second node. The first node can be part of a first set. The first set can include a sole parent node stored at a first processing node of multiple processing nodes of a distributed system. The second node can be part of a second set. The second set can include a sole parent node stored at a second processing node of the multiple processing nodes. The first and second sets can be disjoint sets. The first conflation event can be received at an event-driven stream application at one of the multiple processing nodes. The method also can include conflating the first set and the second set into a conflated set. The conflated set can include the first and second nodes. The conflated set can include a sole parent node. Data for each node of the conflated set can be stored at the sole parent node of the conflated set at a processing node of the multiple processing nodes.

Although the method described above is with reference to the illustrated flowcharts, it will be appreciated that many other ways of performing the acts associated with the method can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

Although event-driven identity graph conflation has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-13 may be modified, and that the foregoing discussion of certain of these embodiments does not necessarily represent a complete description of all possible embodiments. For example, one or more of the procedures, processes, or activities of FIG. 6 may include different procedures, processes, and/or activities and be performed by many different modules, in many different orders. As another example, one or more of the procedures, processes, and/or activities of one of FIGS. 7-12 can be performed in another one of FIGS. 7-12. As another example, the systems within processing node 1300 in FIG. 13 can be interchanged or otherwise modified.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A distributed system comprising:
   one or more processors;
   multiple processing nodes running on the one or more processors,
   wherein the one or more processors are configured to perform:
   receiving a first conflation event identifying a first node and a second node, wherein the first node is part of a first set, the first set comprises a sole parent node stored at a first processing node of the multiple processing nodes, the second node is part of a second set, the second set comprises a sole parent node stored at a second processing node of the multiple processing nodes, the first and second sets are disjoint sets, and the first conflation event is received at an event-driven stream application at one of the multiple processing nodes; and
   conflating the first set and the second set into a conflated set, wherein the conflated set comprises the first and second nodes, wherein the conflated set comprises a sole parent node, and data for each node of the conflated set is stored at the sole parent node of the conflated set at a processing node of the multiple processing nodes,
   wherein:

the first set, the second set, and the conflated set are each a respective graph;

the sole parent node of the conflated set is a first one of the sole parent node of the first set or the sole parent node of the second set;

a second one of the sole parent node of the first set or the sole parent node of the second set is a child node of the first one in the conflated set;

the first one is lexicographically smaller than the second one; and the first set, the second set, and the conflated set correspond to an identity of a user.

2. The distributed system of claim 1, wherein:
the first node is the sole parent node of the first set;
the second node is the sole parent node of the second set;
the first node is lexicographically smaller than the second node;
data for the first node are stored at the first node;
the second set further comprises a third node that is a child node mapped to the second node;
the third node is stored at a third processing node of the multiple processing nodes; and
data for the second node and data for the third node are stored at the second node.

3. The distributed system of claim 2, wherein:
the first conflation event is received at the first processing node; and
conflating the first set and the second set into the conflated set further comprises:
  changing a state of the first node to a conflating state;
  sending, from the first node to the second node, a root event identifying the first node;
  determining, at the second node, that the first node is lexicographically smaller than the second node;
  changing a state of the second node to a packed state;
  sending, from the second node to the first node, a data event comprising the data for the second node and the data for the third node;
  storing the data for the second node and the data for the third node at the first node;
  changing the state of the first node to a normal state;
  sending, from the first node to each of the second node and the third node, a change-root event identifying the first node;
  deleting the data for the second node and the data for the third node from the second node;
  setting the second node to be a child node mapped to the first node;
  changing the state of the second node to a normal state; and
  setting the third node to be a child node mapped to the first node.

4. The distributed system of claim 2, wherein:
the first conflation event is received at the second processing node; and
conflating the first set and the second set into the conflated set further comprises:
  changing a state of the second node to a conflating state;
  sending, from the second node to the first node, a first root event identifying the second node;
  determining, at the first node, that the first node is lexicographically smaller than the second node;
  changing a state of the first node to the conflating state;
  sending, from the first node to the second node, a second root event identifying the first node;
  changing the state of the second node to a packed state;
  sending, from the second node to the first node, a data event comprising the data for the second node and the data for the third node;
  storing the data for the second node and the data for the third node at the first node;
  changing the state of the first node to a normal state;
  sending, from the first node to each of the second node and the third node, a change-root event identifying the first node;
  deleting the data for the second node and the data for the third node from the second node;
  setting the second node to be a child node mapped to the first node;
  changing the state of the second node to a normal state; and
  setting the third node to be a child node mapped to the first node.

5. The distributed system of claim 2, wherein:
the first set further comprises a fourth node that is a child node mapped to the first node;
the fourth node is stored at a fourth processing node of the multiple processing nodes; and
data for the fourth node are stored at the first node.

6. The distributed system of claim 1, wherein:
the first conflation event is received at the first processing node; and
conflating the first set and the second set into the conflated set further comprises:
  changing a state of the first node to a conflating state based on the first conflation event;
  receiving, while the state of the first node is the conflating state, a second conflation event at the first processing node identifying the first node and a third node;
  adding the second conflation event to a to-be-conflated queue at the first node; and
  when the state of the first node changes to a normal state, changing a state of the first node to the conflating state based on the second conflation event.

7. The distributed system of claim 1, wherein:
the first node is the sole parent node of the first set;
the second node is the sole parent node of the second set;
the first conflation event is received at the first processing node; and
conflating the first set and the second set into the conflated set further comprises:
  changing a state of the first node to a conflating state based on the first conflation event;
  determining, at the first node, a first conflation hash identifier for the first conflation event;
  receiving, while the state of the first node is the conflating state, a second conflation event at a third processing node identifying the second node and a third node, wherein the third node is stored at the third processing node, the third node is a sole parent node of a third set, and the first set, the second set, and the third set are disjoint sets;
  changing a state of the third node to the conflating state based on the second conflation event;
  determining, at the third node, a second conflation hash identifier for the second conflation event;
  sending, from the first node to the second node, a first root event identifying the first node and the first conflation hash identifier;
  determining, at the second node, that the first node is lexicographically smaller than the second node;
  changing a state of the second node to a packed state;

sending, from the third node to the second node, a second root event identifying the third node and the second conflation hash identifier;

sending, from the second node to the first node, a data event comprising the data for the second node;

sending, from the second node to the third node, a concurrent conflation event comprising the second conflation hash identifier;

sending one or more retries up to a retry limit, from the third node to the second node, for the second root event; and when the state of the second node changes to a normal state and one of the one or more retries is received at the second node, changing a state of the second node to the conflating state based on the second conflation event.

8. The distributed system of claim 7, wherein:

the retry limit is randomized to overcome cyclic deadlocks.

9. The distributed system of claim 1, wherein:

the first set further comprises a third node;

the third node is stored at a third processing node of the multiple processing nodes;

the third node is the sole parent node of the first set;

the second set further comprises a fourth node;

the fourth node is stored at a fourth processing node of the multiple processing nodes;

the fourth node is the sole parent node of the second set;

the first node is a child node mapped to the third node;

the second node is a child node mapped to the fourth node;

data for the first node and data for the third node are stored at the third node; and data for the second node and data for the fourth node are stored at the fourth node.

10. The distributed system of claim 9, wherein:

the first conflation event is received at the first processing node; and conflating the first set and the second set into the conflated set further comprises:

determining, at the first node, that a parent of the first node is the third node;

sending, from the first node to the third node, a second conflation event identifying the third node and the second node;

changing a state of the third node to a conflating state;

sending, from the third node to the second node, a first root event identifying the third node;

determining, at the second node, that a parent of the second node is the fourth node;

sending, from the second node to the fourth node, a second root event identifying the third node;

determining, at the fourth node, that the third node is lexicographically smaller than the fourth node;

changing a state of the fourth node to a packed state;

sending, from the fourth node to the third node, a data event comprising the data for the second node and the data for the fourth node;

storing the data for the second node and the data for the fourth node at the third node;

changing the state of the third node to a normal state;

sending, from the third node to each of the second node and the fourth node, a change-root event identifying the third node;

deleting the data for the second node and the data for the fourth node from the fourth node;

setting the fourth node to be a child node mapped to the third node;

changing the state of the fourth node to a normal state; and setting the second node to be a child node mapped to the third node.

11. A method comprising:

receiving a first conflation event identifying a first node and a second node, wherein the first node is part of a first set, the first set comprises a sole parent node stored at a first processing node of multiple processing nodes of a distributed system, the second node is part of a second set, the second set comprises a sole parent node stored at a second processing node of the multiple processing nodes, the first and second sets are disjoint sets, and the first conflation event is received at an event-driven stream application at one of the multiple processing nodes; and conflating the first set and the second set into a conflated set, wherein the conflated set comprises the first and second nodes, wherein the conflated set comprises a sole parent node, and data for each node of the conflated set is stored at the sole parent node of the conflated set at a processing node of the multiple processing nodes, wherein:

the first set, the second set, and the conflated set are each a respective graph;

the sole parent node of the conflated set is a first one of the sole parent node of the first set or the sole parent node of the second set;

a second one of the sole parent node of the first set or the sole parent node of the second set is a child node of the first one in the conflated set;

the first one is lexicographically smaller than the second one; and the first set, the second set, and the conflated set correspond to an identity of a user.

12. The method of claim 11, wherein:

the first node is the sole parent node of the first set;

the second node is the sole parent node of the second set;

the first node is lexicographically smaller than the second node;

data for the first node are stored at the first node;

the second set further comprises a third node that is a child node mapped to the second node;

the third node is stored at a third processing node of the multiple processing nodes; and data for the second node and data for the third node are stored at the second node.

13. The method of claim 12, wherein:

the first conflation event is received at the first processing node; and conflating the first set and the second set into the conflated set further comprises:

changing a state of the first node to a conflating state;

sending, from the first node to the second node, a root event identifying the first node;

determining, at the second node, that the first node is lexicographically smaller than the second node;

changing a state of the second node to a packed state;

sending, from the second node to the first node, a data event comprising the data for the second node and the data for the third node;

storing the data for the second node and the data for the third node at the first node;

changing the state of the first node to a normal state;

sending, from the first node to each of the second node and the third node, a change-root event identifying the first node;
deleting the data for the second node and the data for the third node from the second node;
setting the second node to be a child node mapped to the first node;
changing the state of the second node to a normal state; and
setting the third node to be a child node mapped to the first node.

14. The method of claim 12, wherein:
the first conflation event is received at the second processing node; and
conflating the first set and the second set into the conflated set further comprises:
changing a state of the second node to a conflating state;
sending, from the second node to the first node, a first root event identifying the second node;
determining, at the first node, that the first node is lexicographically smaller than the second node;
changing a state of the first node to the conflating state;
sending, from the first node to the second node, a second root event identifying the first node;
changing the state of the second node to a packed state;
sending, from the second node to the first node, a data event comprising the data for the second node and the data for the third node;
storing the data for the second node and the data for the third node at the first node;
changing the state of the first node to a normal state;
sending, from the first node to each of the second node and the third node, a change-root event identifying the first node;
deleting the data for the second node and the data for the third node from the second node;
setting the second node to be a child node mapped to the first node;
changing the state of the second node to a normal state; and
setting the third node to be a child node mapped to the first node.

15. The method of claim 12, wherein:
the first set further comprises a fourth node that is a child node mapped to the first node;
the fourth node is stored at a fourth processing node of the multiple processing nodes; and
data for fourth node are stored at the first node.

16. The method of claim 11, wherein:
the first conflation event is received at the first processing node; and
conflating the first set and the second set into the conflated set further comprises:
changing a state of the first node to a conflating state based on the first conflation event;
receiving, while the state of the first node is the conflating state, a second conflation event at the first processing node identifying the first node and a third node;
adding the second conflation event to a to-be-conflated queue at the first node; and
when the state of the first node changes to a normal state, changing a state of the first node to the conflating state based on the second conflation event.

17. The method of claim 11, wherein:
the first node is the sole parent node of the first set;
the second node is the sole parent node of the second set;
the first conflation event is received at the first processing node; and
conflating the first set and the second set into the conflated set further comprises:
changing a state of the first node to a conflating state based on the first conflation event;
determining, at the first node, a first conflation hash identifier for the first conflation event;
receiving, while the state of the first node is the conflating state, a second conflation event at a third processing node identifying the second node and a third node, wherein the third node is stored at the third processing node, the third node is a sole parent node of a third set, and the first set, the second set, and the third set are disjoint sets;
changing a state of the third node to the conflating state based on the second conflation event;
determining, at the third node, a second conflation hash identifier for the second conflation event;
sending, from the first node to the second node, a first root event identifying the first node and the first conflation hash identifier;
determining, at the second node, that the first node is lexicographically smaller than the second node;
changing a state of the second node to a packed state;
sending, from the third node to the second node, a second root event identifying the third node and the second conflation hash identifier;
sending, from the second node to the first node, a data event comprising the data for the second node;
sending, from the second node to the third node, a concurrent conflation event comprising the second conflation hash identifier;
sending one or more retries up to a retry limit, from the third node to the second node, for the second root event; and
when the state of the second node changes to a normal state and one of the one or more retries is received at the second node, changing a state of the second node to the conflating state based on the second conflation event.

18. The method of claim 17, wherein:
the retry limit is randomized to overcome cyclic deadlocks.

19. The method of claim 11, wherein:
the first set further comprises a third node;
the third node is stored at a third processing node of the multiple processing nodes;
the third node is the sole parent node of the first set;
the second set further comprises a fourth node;
the fourth node is stored at a fourth processing node of the multiple processing nodes;
the fourth node is the sole parent node of the second set;
the first node is a child node mapped to the third node;
the second node is a child node mapped to the fourth node;
data for the first node and data for the third node are stored at the third node; and
data for the second node and data for the fourth node are stored at the fourth node.

20. The method of claim 19, wherein:
the first conflation event is received at the first processing node; and
conflating the first set and the second set into the conflated set further comprises:

determining, at the first node, that a parent of the first node is the third node;
sending, from the first node to the third node, a second conflation event identifying the third node and the second node;
changing a state of the third node to a conflating state;
sending, from the third node to the second node, a first root event identifying the third node;
determining, at the second node, that a parent of the second node is the fourth node;
sending, from the second node to the fourth node, a second root event identifying the third node;
determining, at the fourth node, that the third node is lexicographically smaller than the fourth node;
changing a state of the fourth node to a packed state;
sending, from the fourth node to the third node, a data event comprising the data for the second node and the data for the fourth node;
storing the data for the second node and the data for the fourth node at the third node;
changing the state of the third node to a normal state;
sending, from the third node to each of the second node and the fourth node, a change-root event identifying the third node;
deleting the data for the second node and the data for the fourth node from the fourth node;
setting the fourth node to be a child node mapped to the third node;
changing the state of the fourth node to a normal state; and
setting the second node to be a child node mapped to the third node.

* * * * *